United States Patent [19]
Kino et al.

[11] Patent Number: 5,889,553
[45] Date of Patent: Mar. 30, 1999

[54] IMAGE PICKUP APPARATUS CAPABLE OF HIGH RESOLUTION IMAGING

[75] Inventors: Yoshiki Kino, Tokyo; Naoya Kaneda, Kanagawa-ken, both of Japan

[73] Assignee: Canon Kabushiki Kaisha, Tokyo, Japan

[21] Appl. No.: 792,920

[22] Filed: Jan. 21, 1997

Related U.S. Application Data

[63] Continuation of Ser. No. 339,407, Nov. 14, 1994, abandoned.

[30] Foreign Application Priority Data

Nov. 17, 1993 [JP] Japan .................................. 5-311343
Apr. 19, 1994 [JP] Japan .................................. 6-080409

[51] Int. Cl.$^6$ .................................................. H04N 5/225
[52] U.S. Cl. ........................................ 348/218; 348/208
[58] Field of Search .................................. 348/218, 208, 348/335, 36, 294, 311

[56] References Cited

U.S. PATENT DOCUMENTS

| | | | |
|---|---|---|---|
| 4,383,170 | 5/1983 | Takagi et al. ........................... | 348/218 |
| 4,589,030 | 5/1986 | Kley ....................................... | 348/218 |
| 4,633,317 | 12/1986 | Uwiva et al. ......................... | 348/335 X |
| 5,182,671 | 1/1993 | Kitagishi et al. ...................... | 359/557 |
| 5,386,228 | 1/1995 | Okino ..................................... | 348/218 |

Primary Examiner—Tuan Ho
Attorney, Agent, or Firm—Robin, Blecker & Daley

[57] ABSTRACT

An image pickup apparatus includes an image pickup element for photoelectrically converting an optical image formed on an image pickup plane via an image pickup optical system and outputting a picked-up image signal, a variable optical system for shifting the optical image on the image pickup plane of the image pickup element, a control part for controlling the variable optical system and the image pickup element to pickup a predetermined field of view larger than the image pickup plane of the image pickup element by causing the image pickup element to pickup a plurality of optical images at a plurality of shifting positions of the variable optical system, respectively, an A/D converter for converting picked-up image signals outputted from the image pickup element into digital image signals, a memory for storing the digital image signals outputted from the A/D converter, and a signal processor for combining the digital image signals corresponding to the plurality of the optical images stored in the memory and producing an image signal corresponding to the predetermined field of view.

21 Claims, 23 Drawing Sheets

FIG.2
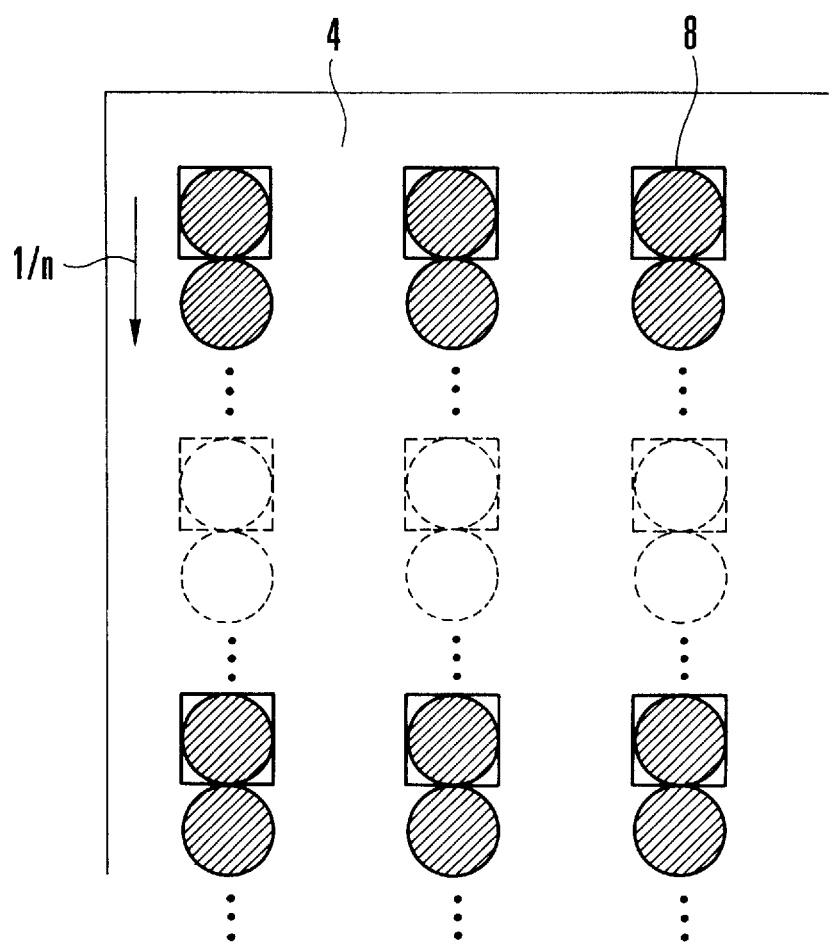
n = NUMBER OF MEMORY BUFFERS
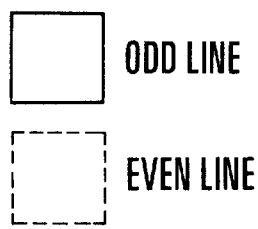

n = NUMBER OF MEMORY BUFFERS

☐ ODD LINE

⌐ ⌐
¦ ¦ EVEN LINE
└ ┘

| FOCAL LENGTH | fw~f4 | f4~f3 | f3~f2 | f2~f1 | f1~fT |
|---|---|---|---|---|---|
| VALUE OF n REQUIRED FOR PIXEL SHIFT | 5 | 4 | 3 | 2 | 1 |

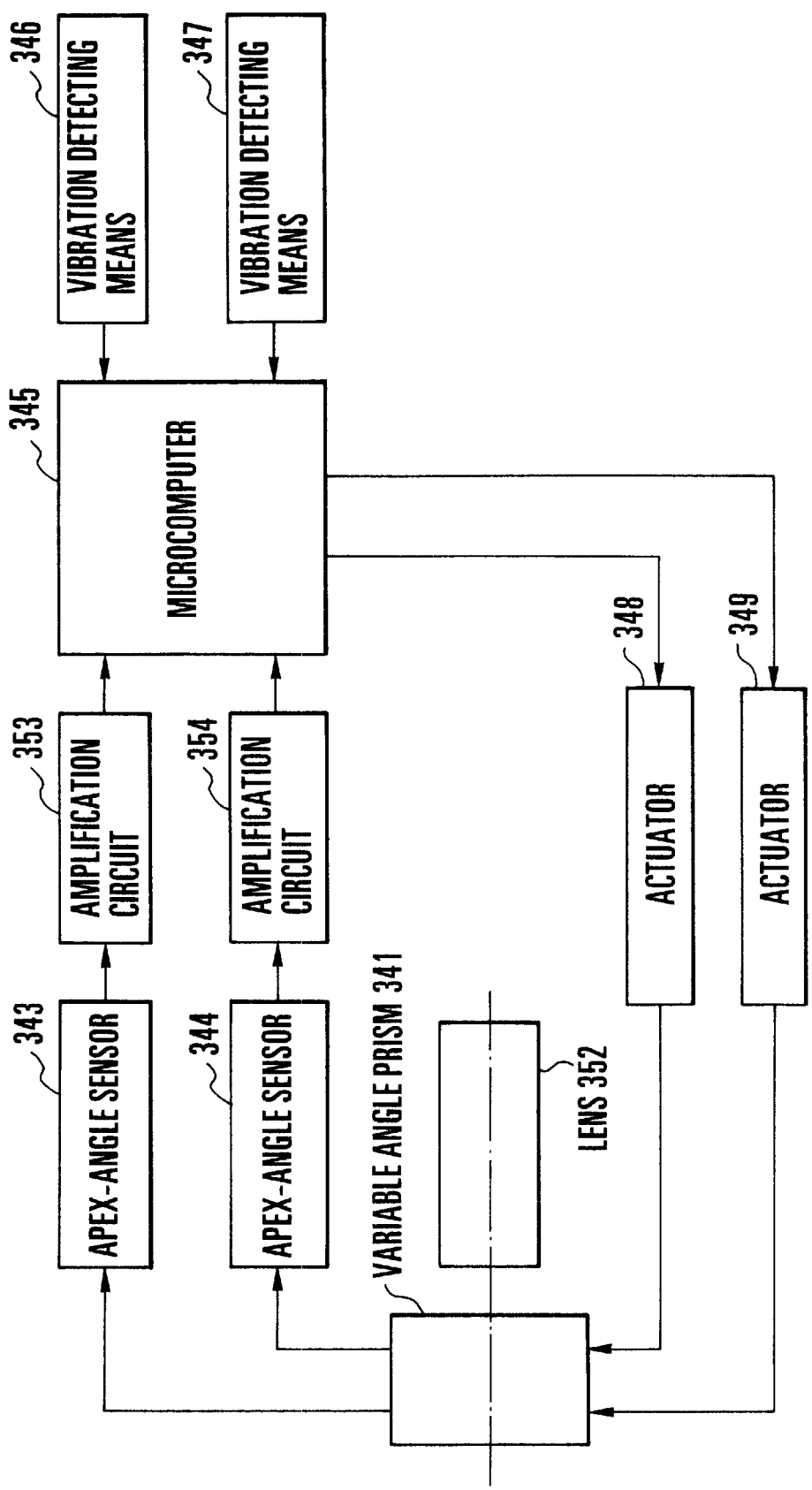

IMAGE PICKUP APPARATUS CAPABLE OF HIGH RESOLUTION IMAGING

This is a continuation application under 37 CFR 1.62 of prior application Ser. No. 08/339,407 filed on Nov. 14, 1994, (abandoned).

BACKGROUND OF THE INVENTION

1. Field of the Invention

The present invention relates to an image pickup apparatus using a solid-state image pickup element, such as a CCD.

2. Description of the Related Art

In general, solid-state image pickup elements, such as CCDs, are presently used as light receiving elements of image pickup apparatuses. In the field of HDTV (High Density Television) or the like, it has been required to improve the image quality of such a solid-state image pickup element to meet a demand for increasing the resolution of TV signals, and there have been attempts to improve the image quality by increasing the number of pixels of the solid-state image pickup element. Although such an attempt needs further improvement of manufacturing techniques, it is impossible to improve them to an unlimited extent.

In such a situation, it has recently been proposed to provide a system for improving the resolution of an image by swinging a solid-state image pickup element to temporarily vary a relative positional relation between an incident optical image and individual pixels and increasing a spatial sampling ratio (the Journal of the Institute of Television Engineers of Japan, Vol. 41, No. 11 (1987)).

Various methods for producing a panoramic video image have heretofore been known, and one proposed method is described in Japanese Laid-Open Patent Application No. Sho 54-3526. This method includes the steps of photographing a subject about the optical axis of a photographic lens of a camera by means of a rotating mirror disposed on a subject side of the camera coaxially to the photographic lens with its reflecting surface opposed to the camera, processing the exposed film to form an intermediate image representative of a panoramic subject image which is recorded in compressed form, loading the film which carries the obtained intermediate image into an enlarger, and projecting the intermediate image on an enlarged scale onto a photosensitive member formed cylindrically around a rotating mirror, by means of the rotating mirror which is disposed coaxially to the enlarging lens and is of the same kind as the aforesaid rotating mirror, thereby producing a panoramic subject image.

However, there are a number of problems in the above-described system for improving the resolution of an image, which adopts an arrangement in which the solid-state image pickup element is made to vibrate periodically by a small amount by a piezoelectric element. For example, highly accurate positioning is needed to incorporate such an arrangement into an optical system, but this positioning is difficult to conduct and is disadvantageous in terms of productivity. In addition, a package having a special structure which involves a great increase in cost is needed to mount the solid-state image pickup element.

The above-described conventional method for producing a panoramic video image has the problem that it is necessary to incorporate a complicated mechanism in the camera since photography is performed by means of the rotating mirror disposed coaxially to the photographic lens on the subject side thereof. In addition, if a panoramic video image is to be actually produced, it is necessary to modify an existing enlarger.

SUMMARY OF THE INVENTION

A first object of the present invention which has been made in light of the above-described problems is, therefore, to provide an image pickup apparatus capable of producing a high-resolution image or a panoramic image by means of a simple arrangement.

To achieve the above object, in accordance with one aspect of the present invention, there is provided an image pickup apparatus which comprises image pickup means for photoelectrically converting an optical image formed in an image pickup plane via an image pickup optical system and outputting a picked-up image signal, a variable optical system for varying an image forming position in the image pickup plane of the optical image made incident on the image pickup means, A/D converting means for converting the picked-up image signal outputted from the image pickup means into a digital picked-up image signal, memory means for storing the digital picked-up image signal outputted from the A/D converting means, and signal processing means for combining picked-up image signals corresponding to a plurality of optical images stored in the memory means, the plurality of optical images being formed in the image forming plane by the variable optical system and being different from each other in their respective image forming positions.

A second object of the present invention is to provide an image pickup apparatus capable of picking up an image of greater size than the image pickup plane of image pickup means.

To achieve the above object, in accordance with another aspect of the present invention, there is provided an image pickup apparatus which comprises image pickup means for photoelectrically converting an optical image formed in an image pickup plane via an image pickup optical system and outputting a picked-up image signal, vibrating means for vibrating an optical axis of the image pickup optical system at intervals of a predetermined period to vary the optical image formed in the image pickup plane, at intervals of the predetermined period, memory means for storing a plurality of optical images which are made incident on the image pickup means and different from each other by the vibrating means, and signal processing means for combining the plurality of optical images stored in the memory means and outputting a resultant image.

A third object of the present invention is to expand the range of photography by using an image-motion correcting optical system.

To achieve the above object, in accordance with another aspect of the present invention, there is provided an image pickup apparatus which comprises image pickup means for photoelectrically converting an optical image formed in an image pickup plane via an image pickup optical system and outputting a picked-up image signal, a memory for storing the picked-up image signal outputted from the image pickup means, a correcting optical system for correcting a motion of an image due to a relative movement between the image pickup means and a subject by varying an optical axis of the image pickup optical system, memory controlling means for driving the correcting optical system in a predetermined direction as well as storing in the memory a plurality of picked-up image signals which are respectively obtained when the correcting optical system is moved to a plurality of different operating positions, and signal processing means for combining the plurality of picked-up image signals stored in the memory means and outputting a resultant image.

A fourth embodiment of the present invention is to provide an image pickup apparatus capable of producing a wide image or a high-quality image by using a variable angle prism.

To achieve the above object, there is provided an image pickup apparatus which is arranged to make an optical image of a subject incident on a solid-state image pickup element via an image pickup optical system, cause the solid-state image pickup element to photoelectrically convert the optical image into an analog image signal, digitize the analog image signal, and perform image processing of the digitized image signal. The image pickup apparatus includes a variable angle prism disposed closer to a subject side than the solid-state image pickup element and made up of two parallel plates held by an elastic member and an enclosed transparent liquid, driving means for relatively tilting the two parallel plates of the variable angle prism to sequentially move an image forming position of the optical image on the solid-state image pickup element, and combining means for combining individual digitized image signals which are obtained when the image forming position of the optical image on the solid-state image pickup element is sequentially moved by the driving means.

In the above-described arrangement, the image forming position of the optical image is made to move by a small amount within the area between pixels of the solid-state image pickup element or by a large amount to an extent approximately equivalent to the width of the solid-state image pickup element. The combining means combines the individual digitized image signals which are obtained when the image forming position of the optical image on the solid-state image pickup element is sequentially moved by the driving means. If the image forming position is moved by a small amount within the area between the pixels of the solid-state image pickup element, the digitized image signals are combined as a high-resolution image signal. If the image forming position is moved by a large amount to an extent approximately equivalent to the width of the solid-state image pickup element, image signals obtained before and after the movement reflect adjacent subjects. By combining the image signals, a panoramic image signal is obtained.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 2 is a view showing a first example of the state in which an optical image of a subject is formed on a solid-state image pickup element by driving a variable angle prism;

FIG. 28 is a block diagram showing the arrangement of an image-shake correcting system using the variable angle prism.

DETAILED DESCRIPTION OF THE PREFERRED EMBODIMENTS

Preferred embodiments of the present invention will be described below with reference to the accompanying drawings.

[First Embodiment]

Figure 1:
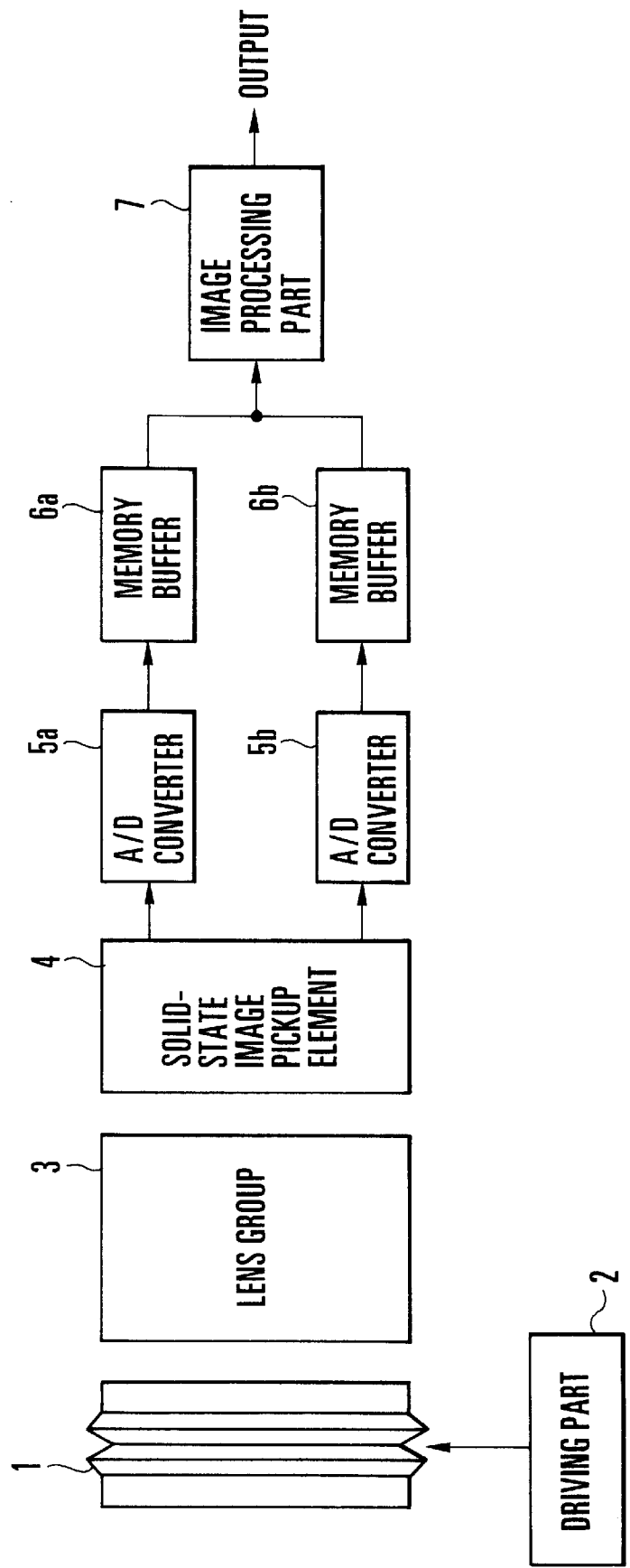
FIG. 1 is a block diagram schematically showing the arrangement of an image pickup apparatus according to a first embodiment of the present invention.

FIG. 1 is a block diagram schematically showing the arrangement of an image pickup apparatus according to a first embodiment of the present invention. The image pickup apparatus shown in FIG. 1 includes a variable angle prism 1 which is constructed in such a manner that an optically transparent substance, such as a liquid or a silicone rubber, is enclosed in a container made up of two transparent, parallel flat plates and a flexible, elastic member which surrounds the space defined between the two transparent, parallel flat plates, a driving part 2 for driving the variable angle prism 1, a lens group 3 made up of a zooming lens, a focusing lens and other associated elements, a solid-state image pickup element 4 such as a CCD, A/D converters 5a and 5b for respectively digitizing analog video signals outputted from the solid-state image pickup element 4, memory buffers 6a and 6b for temporarily storing the respective digitized video signals, and an image processing part 7 for executing predetermined processing, such as the processing of combining the video signals stored in the respective memory buffers 6a and 6b.

The operation of the aforesaid image pickup apparatus will be described below. Incident light which reflects a subject image is deflected by the variable angle prism 1 which is driven by a small amount by the driving part 2, and the deflected incident light passes through the lens group 3 and is focused on the solid-state image pickup element 4. The solid-state image pickup element 4 photoelectrically converts the deflected incident light, which reflects the subject image, into analog video signals and outputs the analog video signals. The analog video signals are digitized by the respective A/D converters 5a and 5b. The digitized video signals are alternately stored in the respective memory buffers 6a and 6b each time the variable angle prism 1 is driven. The video signals stored in the respective memory buffers 6a and 6b are combined by the image processing part 7, thereby providing an image of higher resolution.

The transfer of charge from the solid-state image pickup element 4 is performed at intervals of a period obtained by dividing a one-field scanning period by the number of memory buffers used. In this embodiment, since the two memory buffers 6a and 6b are provided, the transfer of charge from the solid-state image pickup element 4 may be performed at intervals of a period which is half the one-field scanning period.

The video signals temporarily stored in the respective memory buffers 6a and 6b are combined by the image processing part 7 in the above-described manner, and the thus-obtained video signal is transferred from the image processing part 7 to an output part (not shown). The video signal is processed by the output part so that it can be outputted in digital form. If it is necessary to output the video signal in analog form, a D/A converter for converting the video signal into an analog signal may be added to the output part.

The operation of the driving part 2 will be described below in detail. As described above, the transfer of charge from the solid-state image pickup element 4 is performed at intervals of a period obtained by dividing a one-field scanning period by the number of memory buffers used. Similarly, the driving frequency of the driving part 2 may be a frequency obtained by dividing the one-field scanning period by the number of memory buffers used.

Figure 3:
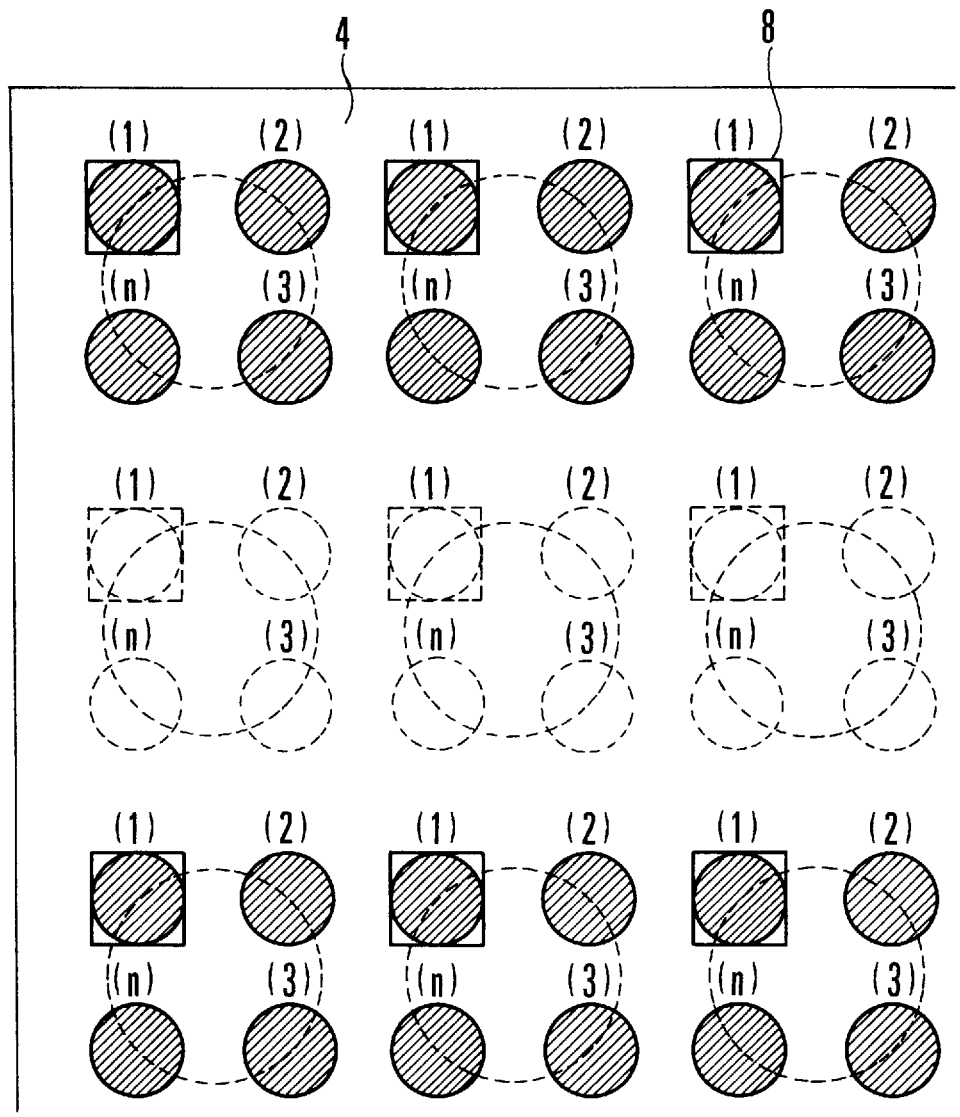
FIG. 3 is a view showing a second example of the state in which an optical image of a subject is formed on the solid-state image pickup element by driving the variable angle prism.

The state of the subject image formed on the solid-state image pickup element 4 through the variable angle prism 1 driven by the driving part 2 will be described below with reference to FIGS. 2 and 3. FIGS. 2 and 3 are partial plan views of the solid-state image pickup element 4, and each pixel is indicated by reference numeral 8.

First of all, the operation of the driving part 2 to form the subject image on the solid-state image pickup element 4 in the state shown in FIG. 2 will be described below. First, the variable angle prism 1 is driven so that an image forming position at which the subject image is to be initially formed can be made coincident with the location of the pixels 8. After the charge of the solid-state image pickup element 4 has been transferred during the above-described state, the variable angle prism 1 is driven to cause the image forming position to move in the sub-scan direction by a distance which is 1/n of the distance between each even line and the adjacent odd line ("n" represents the number of memory buffers used). After the charge of the solid-state image pickup element 4 has similarly been transferred during this state, the variable angle prism 1 is further driven to cause the image forming position to move in the sub-scan direction by the distance which is 1/n of the distance between each even line and the adjacent odd line (i.e., by a distance of 2/n from the initial position). Similar processing is performed until the image forming position is moved by a distance of (n−1)/n. After the charge of the solid-state image pickup element 4 has been transferred with the image forming position being moved by the distance of (n−1)/n, the image forming position is returned to the initial image forming position. Subsequently, an operation similar to the above-described operation is repeated.

By the above-described operation, video signals for (n−1) lines of pixels are interpolated between the pixels arrayed along each even line and the pixels arrayed along the adjacent odd line, whereby an image of higher resolution can be obtained.

The operation of the driving part 2 to form the subject image on the solid-state image pickup element 4 in the state shown in FIG. 3 will be described below. First, the variable angle prism 1 is driven so that an image forming position at which the subject image is to be initially formed can be made coincident with the pixel location (1) shown in FIG. 3. After the charge of the solid-state image pickup element 4 has been transferred during the above-described state, the variable angle prism 1 is driven so that the image forming position can be made coincident with the pixel location (2) shown in FIG. 3, and the charge of the solid-state image pickup element 4 is transferred during this state. Then, the variable angle prism 1 is driven so that the image forming position can be made coincident with the pixel location (3) shown in FIG. 3. After the charge of the solid-state image pickup element 4 has been transferred during this state, the variable angle prism 1 is driven so that the image forming position can be made coincident with the pixel location (n) shown in FIG. 3. After the charge of the solid-state image pickup element 4 has been transferred during this state, the variable angle prism 1 is driven so that the image forming position can be made coincident with the pixel location (1) shown in FIG. 3. Subsequently, an operation similar to the above-described operation is repeated.

By the above-described operation, video signals are interpolated not only between the pixels arrayed along each even line and the pixels arrayed along the adjacent odd line but also between the adjacent pixels in the main-scan direction, whereby an image of far higher resolution can be obtained.

Figure 4:
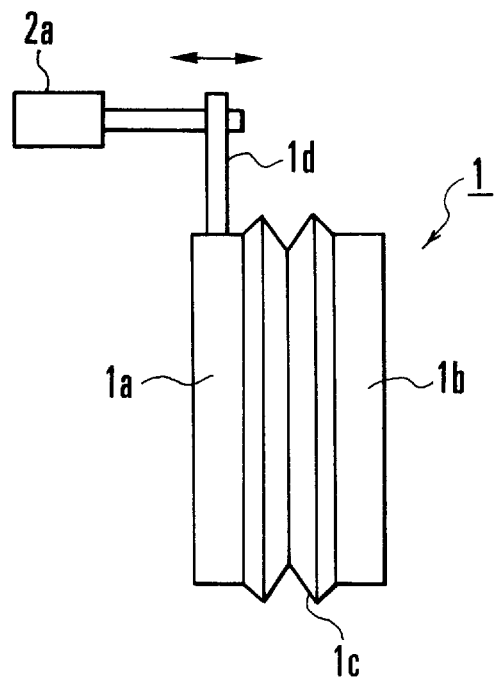
FIG. 4 is a schematic view showing a first example of a driving mechanism of the variable angle prism.

The driving part 2 for driving the variable angle prism 1 utilizes a voice coil motor, a stepping motor or the like. A driving mechanism for realizing the operation described above in connection with FIG. 2 may be provided with a single driving part 2 as shown in FIG. 4. A driving mechanism for realizing the operation described above in connection with FIG. 3 may be provided with two driving parts 2 as shown in FIG. 5.

Figure 5:
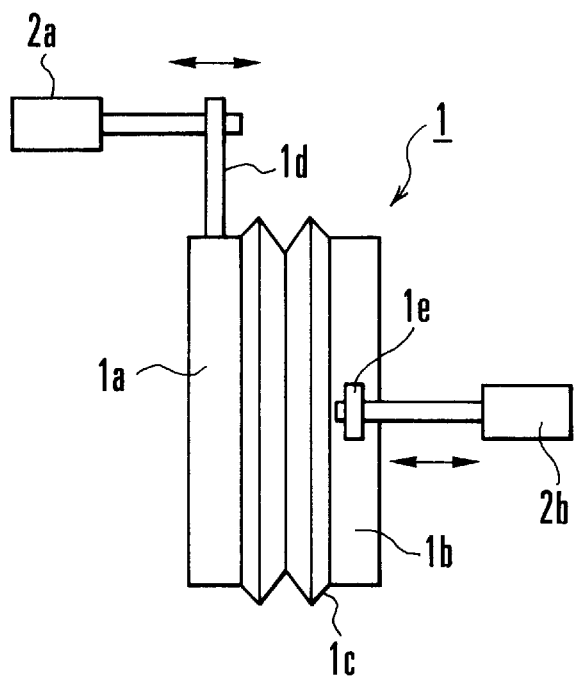
FIG. 5 is a schematic view showing a second example of the driving mechanism of the variable angle prism.

As specifically shown in FIGS. 4 and 5, the variable angle prism 1 includes two transparent, parallel flat plates 1a and 1b, a bellows-shaped, flexible container 1c which surrounds the space defined between the two parallel flat plates 1a and 1b, and an optically transparent substance, such as a liquid or a silicone rubber, which is enclosed in the flexible container 1c. As shown in FIG. 4, a holding member 1d is disposed to extend from the parallel flat plate 1a in a direction perpendicular to the direction of the optical axis. If the holding member 1d is moved in the direction of the optical axis by a motor 2a of the driving part 2, the two parallel flat plates 1a and 1b can be relatively tilted in the sub-scan direction of the solid-state image pickup element 4. Accordingly, in the arrangement shown in FIG. 4, it is possible to move the image forming position on the solid-state image pickup element 4 in the sub-scan direction as shown in FIG. 2.

As shown in FIG. 5, in addition to the holding member 1d, a holding member 1e may be disposed to extend from the parallel flat plate 1b in a direction perpendicular to the axis of the holding member 1d. If the holding members 1d and 1e are respectively moved in the direction of the optical axis by the motor 2a and a motor 2b of the driving part 2, the two parallel flat plates 1a and 1b can be relatively tilted in the sub-scan direction and the main-scan direction of the solid-state image pickup element 4. Accordingly, in the arrangement shown in FIG. 5, it is possible to move the image forming position on the solid-state image pickup element 4 in the sub-scan direction and the main-scan direction as shown in FIG. 3.

[Second Embodiment]

Figure 6:
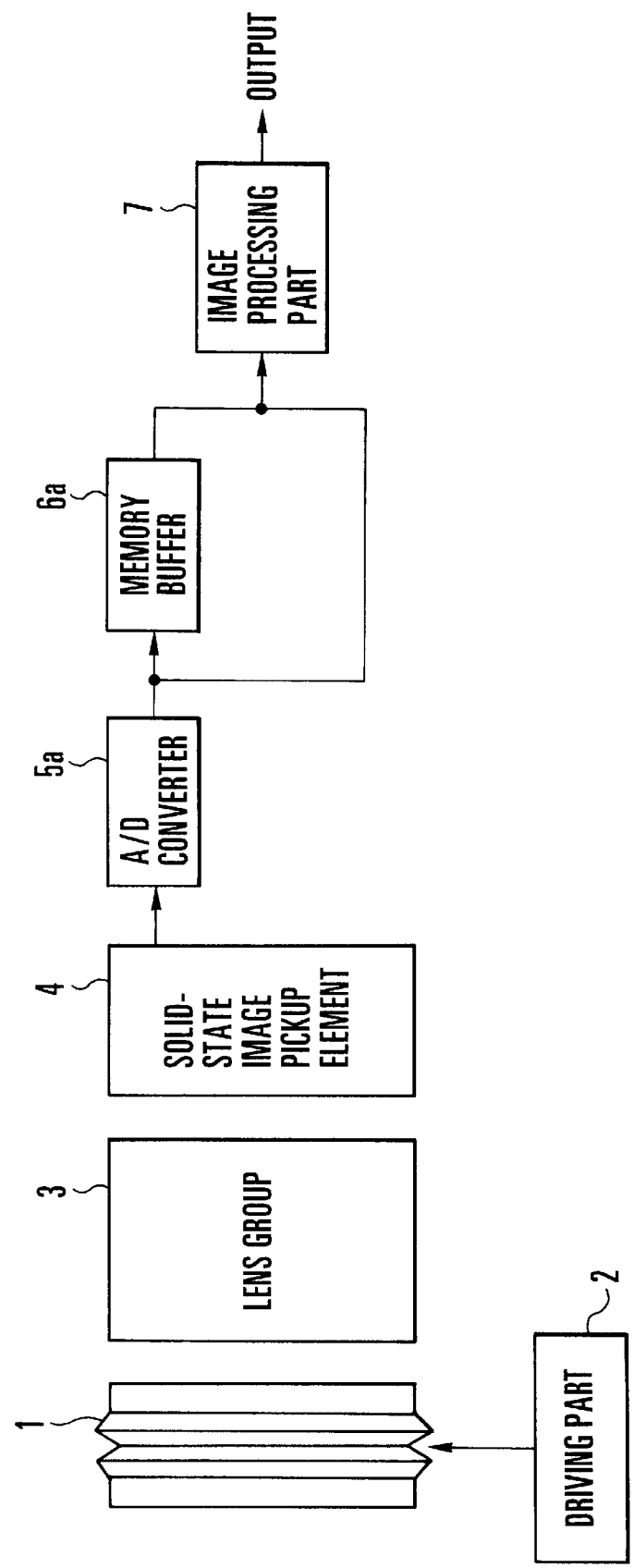
FIG. 6 is a block diagram schematically showing the arrangement of an image pickup apparatus according to a second embodiment of the present invention.

FIG. 6 is a block diagram schematically showing the arrangement of an image pickup apparatus according to a second embodiment of the present invention. The second embodiment differs from the first embodiment in that one memory buffer is omitted and one A/D converter is also omitted, i.e., one memory buffer 6a alone is provided.

According to the second embodiment using only one memory buffer as shown in FIG. 6, it is possible to achieve effects substantially similar to those of the first embodiment. Specifically, referring to FIG. 6, the variable angle prism 1 is initially driven by a small amount by the driving part 2 so that a subject image can be formed on the pixels of the solid-state image pickup element 4. The video signal obtained from the solid-state image pickup element 4 during this state is digitized by the A/D converter 5a, and the digitized video signal is stored in the memory buffer 6a.

After the charge of the solid-state image pickup element 4 has been transferred, the variable angle prism 1 is driven by a small amount by the driving part 2 so that the subject image can be formed between the pixels of the solid-state image pickup element 4. The video signal obtained from the solid-state image pickup element 4 during this state is digitized by the A/D converter 5a, and the digitized video signal is transferred directly to the image processing part 7 without being passed through the memory buffer 6a. By transferring the video signal stored in the memory buffer 6a and multiplexing it with the video signal transferred directly to the image processing part 7, it is possible to interpolate video signals between the pixels, thereby providing an image of higher resolution. Incidentally, a method for driving the variable angle prism 1 in the second embodiment may be similar to the method employed in the first embodiment.

[Third Embodiment]

In the first embodiment, the variable angle prism 1 is driven at a frequency obtained by dividing a one-field scanning period by the number of memory buffers used, and the video signal obtained from the solid-state image pickup element 4 is alternately stored in the memory buffers 6a and 6b each time the variable angle prism 1 is driven. The stored video signals are combined by the image processing part 7. In the third embodiment, the variable angle prism 1 is operated in the following manner.

Specifically, referring to FIG. 1, regarding the first field, the variable angle prism 1 is driven by a small amount by the driving part 2 so that a subject image can be formed on the pixels of the solid-state image pickup element 4. Accordingly, incident light is deflected by the variable angle prism 1, and the deflected incident light passes through the lens group 3 to form the subject image on the pixels of the solid-state image pickup element 4. The video signal obtained from the solid-state image pickup element 4 is digitized by the A/D converter 5a, and the digitized video signal is stored in the memory buffer 6a.

Regarding the second field, the variable angle prism 1 is driven by a small amount. The incident light is deflected by the variable angle prism 1 which has been driven by the small amount, and the deflected incident light passes through the lens group 3 to form a subject image at a position which is shifted from the pixels of the solid-state image pickup element 4 to a small extent. The video signal obtained from the solid-state image pickup element 4 is digitized by the A/D converter 5b, and the digitized video signal is stored in the memory buffer 6b. Then, the respective video signals stored in the memory buffers 6a and 6b are transferred to and combined with each other by the image processing part 7.

Regarding the third field, the variable angle prism 1 is driven by a further small amount. Incident light is deflected by the variable angle prism 1 which has been driven by the further small amount, and the deflected incident light passes through the lens group 3 to form a subject image at a position which is shifted to a small extent from the position on the solid-state image pickup element 4 at which the subject image for the second field has been formed. Then, the video signal obtained from the solid-state image pickup element 4 is digitized by the A/D converter 5a, and the digitized video signal is stored in the memory buffer 6a. Subsequently, during each field, the variable angle prism 1 is driven by a small amount and a similar operation is performed. In the above-described operation, the amount and the direction in which the variable angle prism 1 is driven may be determined in a manner similar to that described previously with reference to FIGS. 2 and 3 in connection with the first and second embodiments.

As described above, according to the third embodiment, by driving the variable angle prism 1 by a small amount in each field, video signals are interpolated between the pixels of the solid-state image pickup element 4. Incidentally, in the third embodiment, although no moving image can be handled, it is possible to provide a still image of high sensitivity and high resolution.

[Fourth Embodiment]

Figure 7:
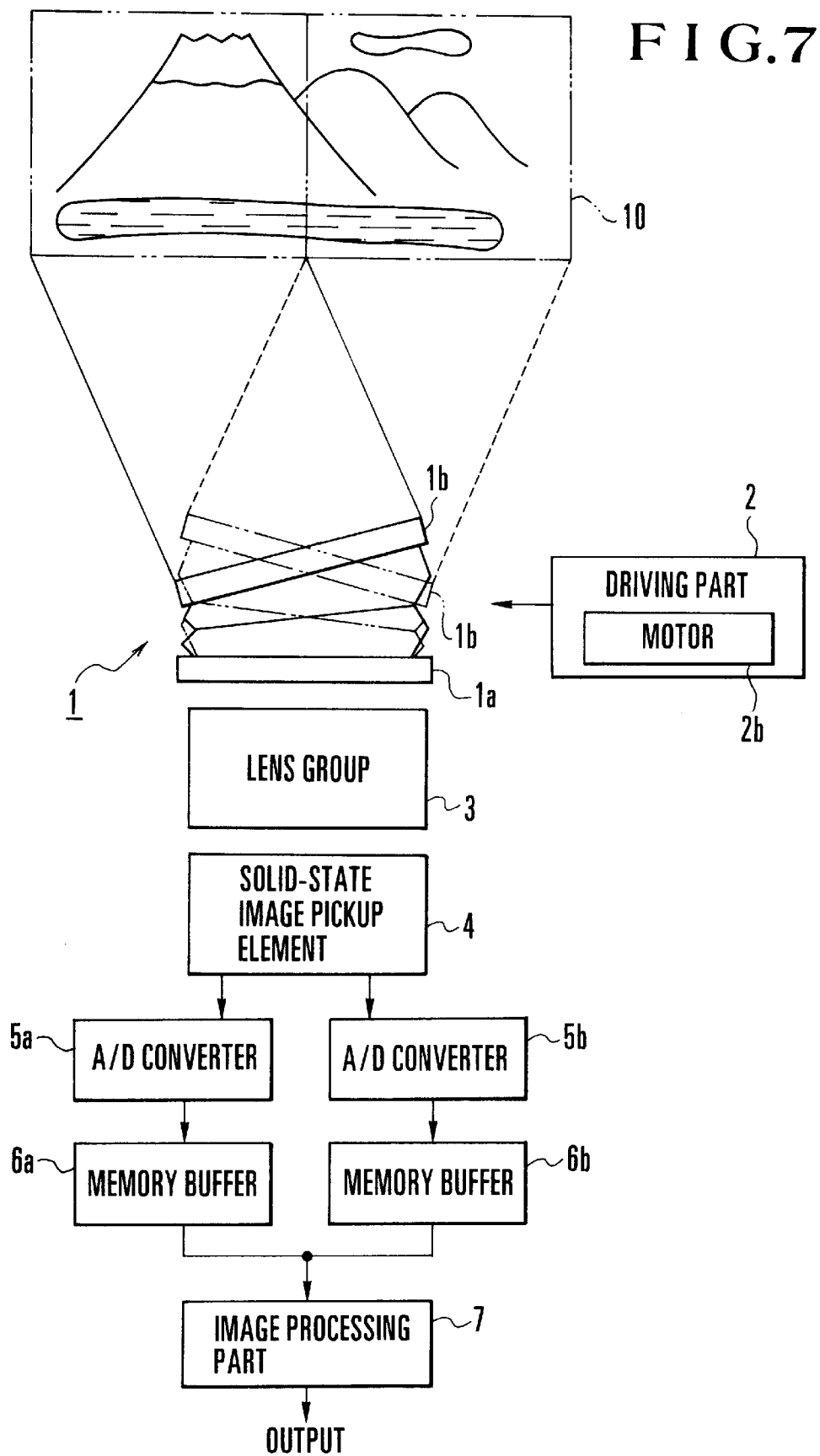
FIG. 7 is a view schematically showing the arrangement of an image pickup apparatus as well as the state of driving of a variable angle prism according to a fourth embodiment of the present invention.

As shown in FIG. 7, a fourth embodiment is intended to provide a panoramic video image by driving the variable angle prism 1 to a great extent. To obtain a panoramic video image having greater width than height, it is necessary to relatively tilt the two parallel flat plates 1a and 1b of the variable angle prism 1 in the main-scan direction of the solid-state image pickup element 4. For this reason, it is necessary to arrange the driving part 2 and its associated elements as shown in FIG. 5. To obtain a panoramic video image having greater height than width, it is necessary to relatively tilt the two parallel flat plates 1a and 1b of the variable angle prism 1 in the sub-scan direction of the solid-state image pickup element 4. For this reason, the driving part 2 and its associated elements may be arranged as shown in FIG. 4.

If it is desired to obtain a panoramic video image having greater width than height, the parallel flat plate 1b is driven by the motor 2b of the driving part 2 so that the distance between the parallel flat plates 1a and 1b is minimized at the left end of the variable angle prism 1 and maximized at the right end thereof, as shown by solid lines in FIG. 7, as viewed in the direction of a subject 10 in FIG. 7. When the parallel flat plate 1b is placed in this state, light rays which reflect a left half of the subject 10 are made incident on the variable angle prism 1.

The light rays which reflect the left half of the subject 10 are deflected by the variable angle prism 1, and are focused on the solid-state image pickup element 4 by the lens group 3. The video signal obtained from the solid-state image pickup element 4, which reflects the left half of the subject 10, is digitized by the A/D converter 5a and stored in the memory buffer 6a.

Then, the parallel flat plate 1a is driven by the motor 2b of the driving part 2 so that the distance between the parallel flat plates 1a and 1b is minimized at the right end of the variable angle prism 1 and maximized at the left end thereof, as shown by dashed lines in FIG. 7, as viewed in the direction of the subject 10 in FIG. 7. When the parallel flat plate 1b is placed in this state, light rays which reflect a right half of the subject 10 are made incident on the variable angle prism 1.

The light rays which reflect the right half of the subject 10 are deflected by the variable angle prism 1, and are focused on the solid-state image pickup element 4 by the lens group 3. A video signal obtained from the solid-state image pickup element 4, which reflects the right half of the subject 10, is digitized by the A/D converter 5b and stored in the memory buffer 6b.

The video signals stored in the memory buffers 6a and 6b, which respectively reflect the right and left halves of the subject 10, are transferred to and combined by the image processing part 7. In this manner, the video signals which respectively reflect the right and left halves of the subject 10 as shown in FIG. 7 are combined to provide a panoramic video image having greater width than height.

The driving part 2 may have an arrangement such as that shown in FIG. 4. If the driving part 2 is arranged as shown in FIG. 4, the parallel flat plates 1a and 1b of the variable angle prism 1 can be relatively tilted to a great extent in the sub-scan direction of the solid-state image pickup element 4, so that a panoramic video image having greater height than width can be obtained. The driving part 2 may also have an arrangement such as that shown in FIG. 4. If the driving part 2 is arranged as shown in FIG. 4, the parallel flat plates 1a and 1b of the variable angle prism 1 can be relatively tilted to a great extent in either of the main-scan and sub-scan directions of the solid-state image pickup element 4, so that a panoramic video image having a picture size extended in an arbitrary direction can be obtained. A single memory buffer and a single A/D converter may also be used, as in the case of the second embodiment.

[Fifth embodiment]

Figure 8:
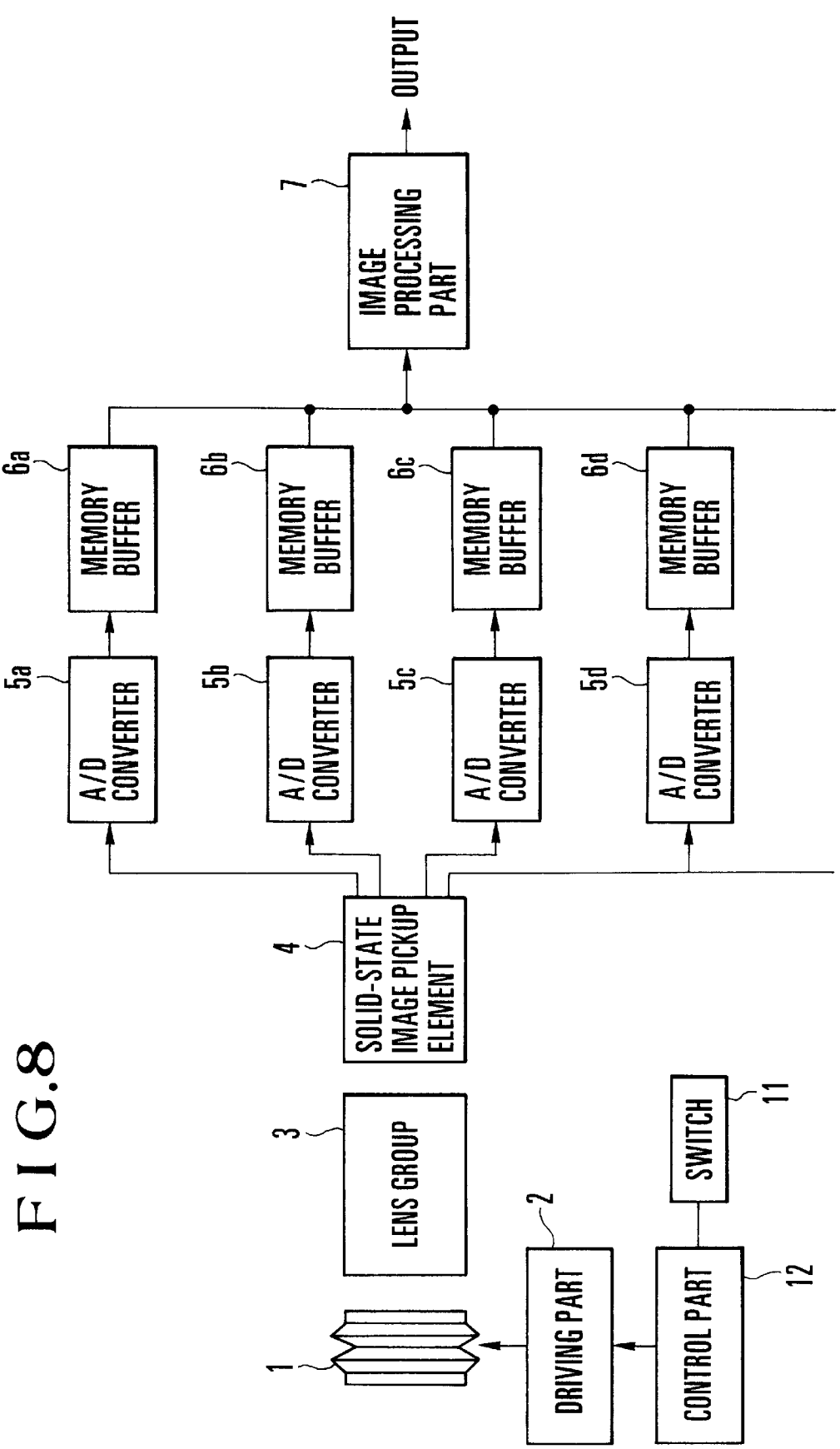
FIG. 8 is a block diagram schematically showing the arrangement of an image pickup apparatus according to a fifth embodiment of the present invention.

A fifth embodiment is provided with both the function of increasing the resolution of an image and the function of producing a panoramic video image, and is arranged to be switchable between a high-resolution mode and a panorama mode. An image pickup apparatus according to the fifth embodiment includes, as shown in FIG. 8, a mode selecting switch 11 for selecting either one of the high-resolution mode and the panorama mode, and a control part 12 for determining the driving mode of the driving part 2 according to the state of manipulation of the mode selecting switch 11, and controlling the driving of the driving part 2 in the determined driving mode to move the variable angle prism 1, thereby providing a high-resolution video image or a panoramic video image. The fifth embodiment also include a multiplicity of memory buffers and A/D converters.

Figure 9:
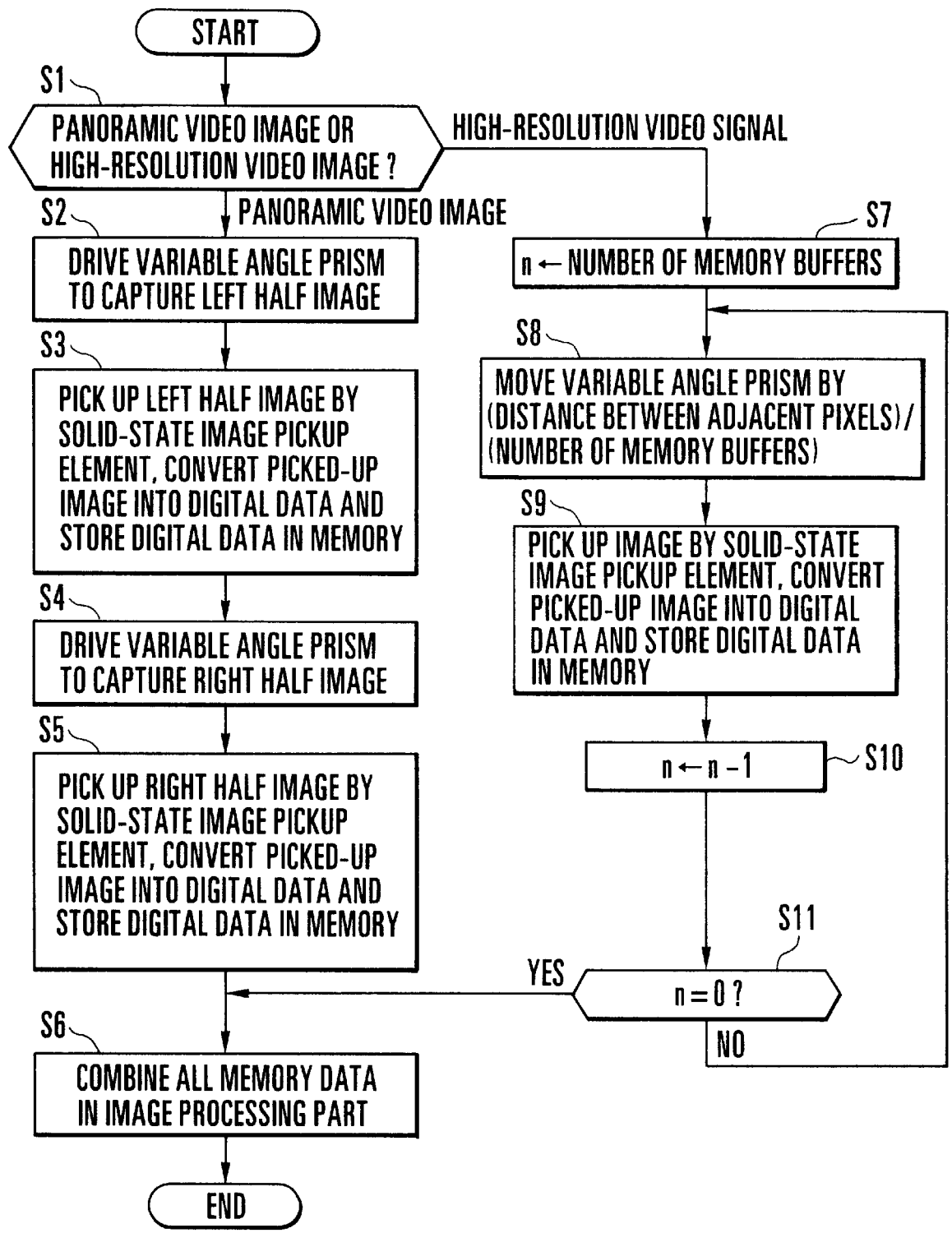
FIG. 9 is a flowchart showing the operation of the image pickup apparatus according to the fifth embodiment of the present invention.

The operation of the image pickup apparatus according to the fifth embodiment will be described below with reference to the flowchart of FIG. 9.

The control part 12 determines which of the high-resolution mode and the panorama mode has been selected by the mode selecting switch 11 (Step S1). If it is determined that the panorama mode has been selected, the parallel flat plate 1a is driven by the motor 2b of the driving part 2 so that the distance between the parallel flat plates 1a and 1b can be minimized at the left end of the variable angle prism 1 and maximized at the right end thereof as viewed in the direction of a subject (Step S2). When the variable angle prism 1 is placed in this state, a left half image of the subject is formed on the solid-state image pickup element 4 by the variable angle prism 1 and the lens group 3, and is photoelectrically converted by the solid-state image pickup element 4. The thus-obtained video signal indicative of the left half of the subject is A/D converted by the A/D converter 5a and stored in the memory buffer 6a (Step S3).

Then, the parallel flat plate 1a can be driven by the motor 2b of the driving part 2 so that the distance between the parallel flat plates 1a and 1b is minimized at the right end of the variable angle prism 1 and maximized at the left end thereof as viewed in the direction of the subject (step S4). When the variable angle prism 1 is placed in this state, a right half image of the subject is formed on the solid-state image pickup element 4 by the variable angle prism 1 and the lens group 3, and is photoelectrically converted by the solid-state image pickup element 4. The thus-obtained video signal indicative of the right half of the subject is A/D converted by the A/D converter 5b and stored in the memory buffer 6b (Step S5). Thus, the required data (signals) are stored in the memory buffers 6a, 6b, . . . (in this example, 6a and 6b). All the data stored in the memory buffers 6a and 6b are combined by the image processing part 7 (Step S6), and the process is brought to an end. A panoramic video image is obtained in the above-described manner.

If it is determined in Step S1 that the high-resolution mode has been selected, the number of the memory buffers 6a, 6b, . . . is set as a variable n (Step S7). Then, the variable angle prism 1 is driven so that an image forming position can be moved by a distance obtained by dividing the distance between adjacent pixels of the solid-state image pickup element 4 by the number of the memory buffers 6a, 6b, . . . (Step S8). A subject image, which is formed on the solid-state image pickup element 4 by the variable angle prism 1 and the lens group 3 when the variable angle prism 1 is placed in the above-described state, is photoelectrically converted into a video signal by the solid-state image pickup element 4. The video signal is A/D converted by a predetermined A/D converter and stored in a predetermined memory (Step S9).

Then, the value of the variable n is decremented by one (Step S10), and it is determined whether the value of the variable n has become zero (Step S11). If the value of the variable n has not yet become zero, the process returns to Step S8. If the value of the variable n has become zero, the process proceeds to Step S6, in which all the video signals stored as the data (signals) in the memory buffers 6a, 6b, . . . are combined by the image processing part 7. Thus, the process is brought an end. A high-resolution video image is obtained in the above-described manner.

As is apparent from the above description, according to the above-described embodiment, since the optical path of a light flux to be made incident on image pickup means is variable, different images can be made incident on the image pickup means along a plurality of optical paths in a time-division manner, so that it is possible to provide a high-quality image or a wide image (panoramic image) by combining the incident different images through image processing.

In addition, it is also possible to provide a high-resolution video image or a panoramic video image by means of a simple arrangement which is designed to relatively tilt two parallel flat plates of a variable angle prism to move the image forming position of an optical image of a subject on a solid-state image pickup element, and combine video signals which are obtained from the solid-state image pickup element through a plurality of movements of the image forming position.

[Sixth Embodiment]

A sixth embodiment of the present invention will be described below.

The sixth embodiment also relates to an image pickup apparatus arranged to provide a high-resolution image by using an image pickup element and actuating means, such as a variable angle prism, for varying an image forming position in an image forming plane of the image pickup element.

As is known, in recent years, photographic apparatuses such as still cameras and video cameras, have been increasingly automated, and various functions, such as an automatic exposure adjusting function and an automatic focus adjusting function, have been put into practice.

In general, zoom lenses have been used as photographic lenses for the photographic apparatuses, such as video cameras, and the zoom ratios of the zoom lenses are becoming increasingly larger year after year.

In contrast, the size of such a photographic apparatus has been remarkably reduced, and small photographic apparatuses which can be held in one hand during photography have been provided against the background of a reduction in the size of the image pickup screen of an image pickup device, the evolution of high-density packaging techniques, the development of mechanical chassis for small recorders, and the like.

However, if a photographer performs photography using such a small video camera having a zoom lens, a harmful image shake easily occurs due to a vibration of a hand of the photographer. To eliminate an image shake and obtain a stable image, various image-shake correcting systems have been proposed. This kind of image-shake correcting system is capable of not only eliminating the harmful image shake due to a vibration of a hand, but also producing a great image-shake correcting effect even in a photographic situation in which no harmful image shake can be easily eliminated with a tripod, for example, even when photography is being performed on a travelling vessel or vehicle.

The image-shake correcting system at least includes vibration detecting means for detecting a vibration and image-shake correcting means for performing a predetermined correction according to information about the detected vibration to prevent occurrence of an image shake.

The vibration detecting means may use known devices such as an angular-acceleration detector, an angular-velocity detector or an angular-displacement detector. The image-shake correcting means may use known systems, such as an optical type of system which uses a variable angle prism (to be described later in detail), and an electronic type of system which is adopted in video cameras which are arranged to cut out a particular image area to be actually used as a picture, from information indicative of a picked-up image. In the electronic type of system, each time an image shake occurs, a cut-out position at which to cut out the particular image area is shifted to a position at which the image shake can be corrected.

The former type of image-shake correcting means which uses the variable angle prism or other optical means to eliminate an image formed on an image pickup element is hereinafter referred to as optical correcting means, and the latter type of image-shake correcting means which eliminates an image shake by electronically processing image information indicative of an image containing the image shake is hereinafter referred to as electronic correcting means.

In general, the optical correcting means is capable of correcting an image shake due to a vibration of not greater than a predetermined angle of vibration of a camera, irrespective of the focal length of a lens. Accordingly, it is possible to achieve practically sufficient, image-shake eliminating performance even if the zoom lens of the camera is set to a long focal length which belongs to its telephoto side. However, the optical correcting means has the disadvantage of increasing the entire size of the camera.

In contrast, the electronic correcting means has a constant correction ratio with respect to, for example, the vertical size of a picture. For this reason, the image-shake correcting performance of the electronic correcting means becomes lower toward the telephoto side of the zoom lens (as the focal length becomes longer). However, the electronic correcting means is generally advantageous in terms of a reduction in the entire size of the camera.

Figure 24A:
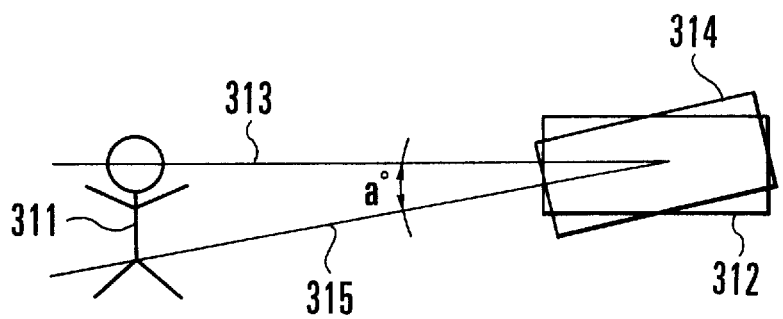
FIGS. 24(A), 24(B) and 24(C) are schematic views showing the relation between the angle of vibration of a camera and an image shake appearing in a picture.
Figure 24B:
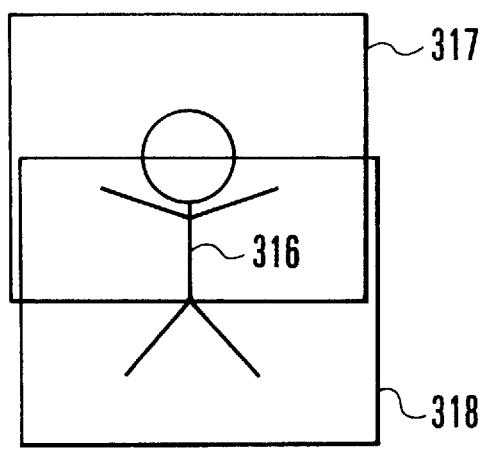
Figure 24C:
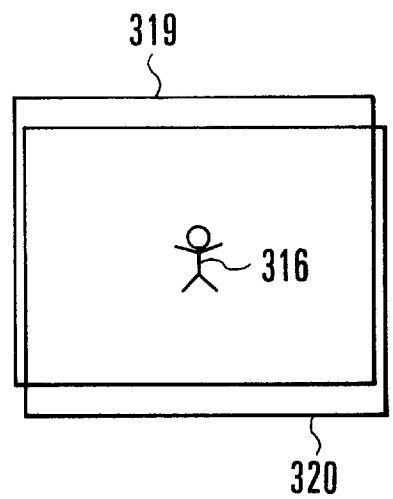

FIGS. 24(A) to 24(C) are views aiding in describing the relation between focal lengths and angles of vibration of a camera, and show the position of a subject in a picture.

Referring to FIG. 24(A), if the camera is placed at the position indicated by 312, the optical axis of the lens of the camera extends as shown by a line 313, and an image of the face of a person 311, i.e., the subject, is picked up approximately in the center of the picture. If the camera in this state is rotated by an angle of "a" degrees owing to a vibration of a hand, the position of the camera changes to that indicated by 314 and the position of the optical axis changes to that indicated by 315.

FIGS. 24(B) and 24(C) respectively show the positions of the subject in the picture when the camera is at the positions 312 and 314. FIG. 24(B) shows the state of the picture obtained when the zoom lens is set to its telephoto end, and FIG. 24(C) shows the state of the picture obtained when the zoom lens is set to its wide-angle end. In FIGS. 24(B) and 24(C), reference numeral 316 denotes the subject viewed in the picture, reference numerals 317 and 319 denote the pictures obtained when the camera is at the position 312, and reference numerals 318 and 320 denote the pictures obtained when the camera is at the position 314.

As can be seen from FIGS. 24(A) to 24(C), if the camera vibrates by the angle of "a" degrees, as the focal length of the zoom lens becomes longer, a more harmful image shake occurs in the picture. For this reason, the optical correcting means, such as a variable angle prism, is more advantageous as image-shake correcting means to be combined with a zoom lens having a longer focal length on its telephoto side.

Figures 25A, 25B, 25C:
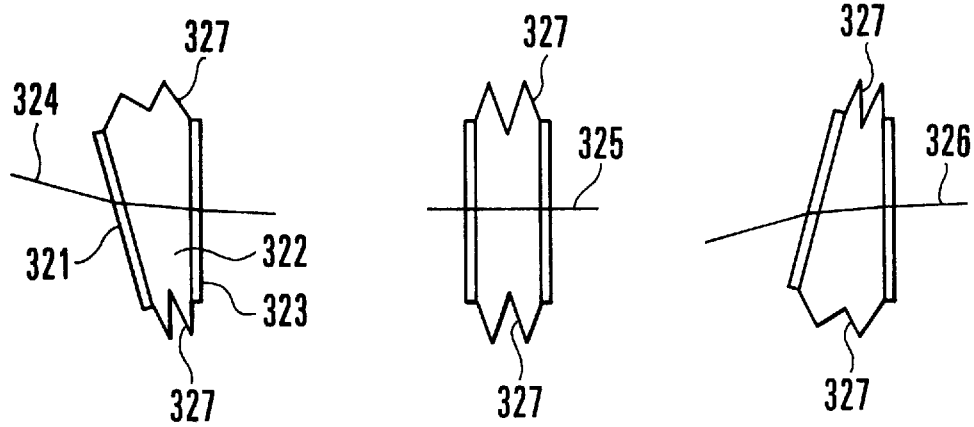
FIGS. 25(A), 25(B) and 25(C) are schematic views showing the operation of a variable angle prism.

FIGS. 25(A) to 25(C) shows the arrangement of a variable angle prism.

In FIG. 25(A), reference numerals 321 and 323 denote glass plates, and reference numeral 327 denotes a bellows part made of, for example, polyethylene. A transparent liquid 322, such as silicone oil, is enclosed in the portion surrounded by the glass plates 321 and 323 and the bellows part 327.

Referring to FIG. 25(B), the two glass plates 321 and 323 are disposed in parallel to each other, and the angle at which a light ray 325 is made incident on the variable angle prism is equal to the angle at which the light ray 325 exits from the variable angle prism. In contrast, if a light ray passes through the variable angle prism at a particular angle such as that shown in FIG. 25(A) or 25(C), the passing light ray is bent like either of the light rays 324 and 326 shown in FIGS. 25(A) and 25(C).

Thus, it is possible to eliminate an image shake by controlling the apex angle of the variable angle prism which is disposed in front of a lens, so that the passing light ray can be bent by an amount corresponding to an angle at which the camera is tilted by a vibration of a hand or another cause.

Figure 26A:
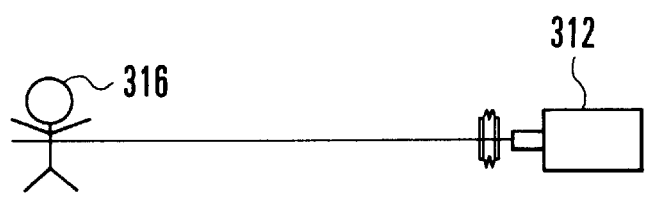
FIGS. 26(A) and 26(B) are schematic views aiding in describing the principle of image-shake correction using a variable angle prism.
Figure 26B:
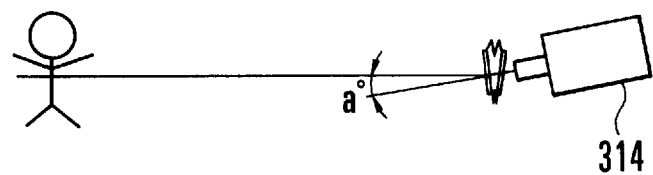

FIGS. 26(A) and 26(B) show the state of the above-described control of the apex angle of the variable angle prism. FIG. 26(A) shows the state in which the variable angle prism is placed in its parallel state and the photographic optical axis of the camera is coincident with the head of the subject. If the camera vibrates by the angle of "a" degrees, the passing light ray is bent as shown in FIG. 26(B) by driving the variable angle prism by an amount corresponding to the angle of "a" degrees. Thus, the photographic optical axis can be kept coincident with the head of the subject.

Figure 27:
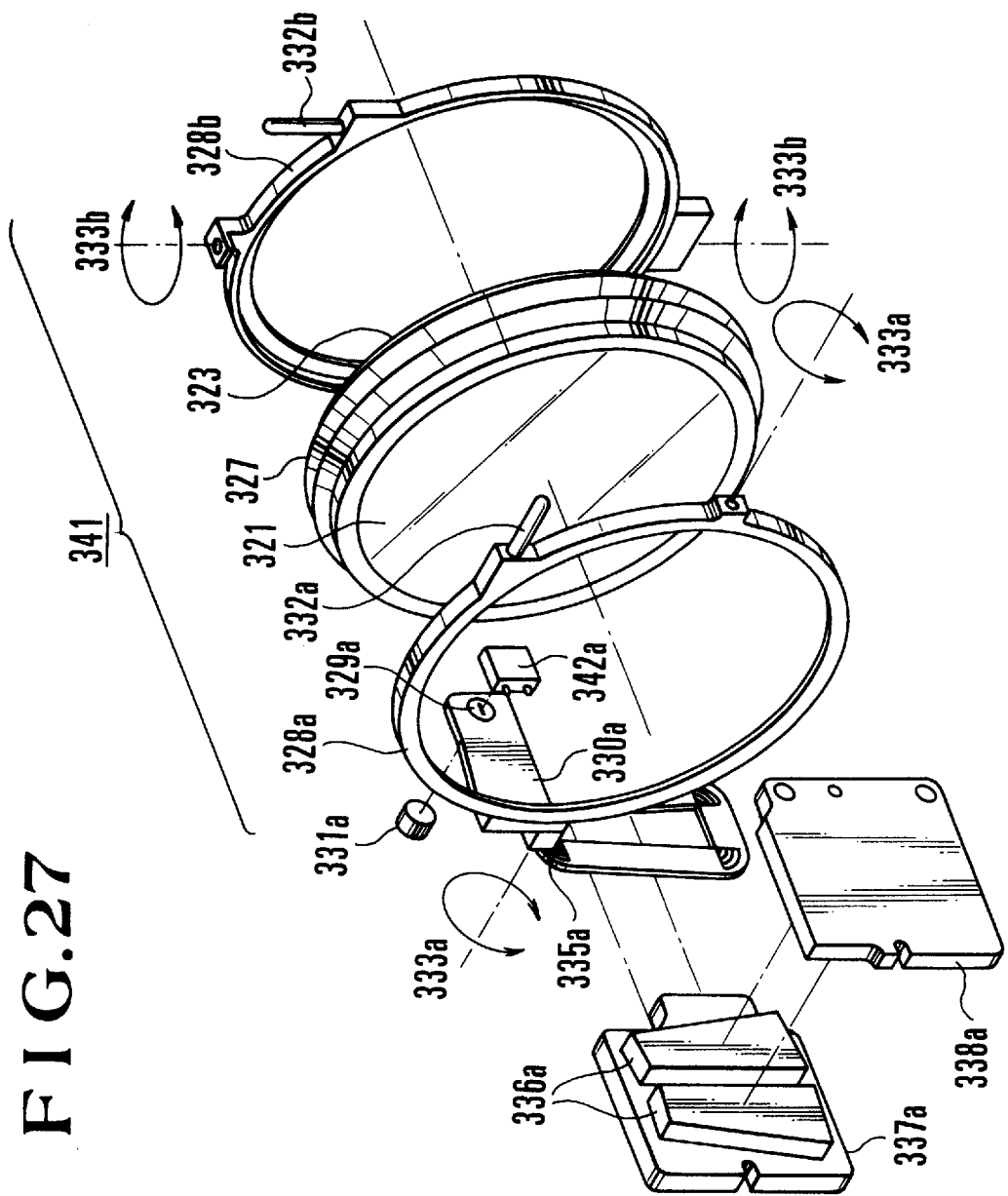
FIG. 27 is an exploded, perspective view of a driving unit of a variable angle prism.

FIG. 27 is a schematic view showing an actual arrangement example of a variable angle prism unit including the aforesaid variable angle prism, an actuator part for driving the variable angle prism, and an apex-angle sensor for detecting the angular state of the variable angle prism.

Since actual vibrations occur in all directions, the variable angle prism is arranged in such a manner that its front and rear glass faces are rotatable about their rotating axes which are 90 degrees offset from each other.

In FIG. 27, reference numerals having affixed characters "a" denote constituent elements which are provided for producing rotations about one of the two rotating axes, while reference numerals having affixed characters "b" denote constituent elements which are provided for producing rotations about the other rotating axis. The constituent elements indicated by identical reference numerals (excluding the affixed character "a" or "b") have completely the same function. For this reason, the following description is made using the reference numerals from which the respective affixed characters "a" or "b" are omitted. The constituent elements arranged on the "b" side are partially shown.

As shown in FIG. 27, a variable angle prism 341 includes glass plates 321 and 323, a bellows part 327, a liquid and other associated elements. The glass plates 321 and 323 are attached to corresponding holding frames 328, as by an adhesive. The respective holding frames 328 constitute rotational axes 333 in combination with corresponding fixed components which are not shown, and are rotatable about their rotational axes 333. The directions of the rotational axes 333 (333a and 333b) are 90 degrees offset from each other. A coil 335 is integrally provided on each of the holding frames 328, and magnets 336 and yokes 337 and 338 are provided on a fixed portion which is not shown. In such an arrangement, if current is made to flow in the coil 335, the variable angle prism 341 turns about the corresponding one of the rotational axes 333. A slit 329 is provided at the extending end of an arm portion 330 which integrally extends from the holding frame 328, and an apex-angle sensor for detecting the angular state of the variable angle prism 341 is formed by the slit 329 as well as a light emitting element 331, such as an iRED, and a light receiving element 342, such as a PSD, which are provided on the fixed portion.

FIG. 28 is a block diagram showing an arrangement in which a lens is combined with an image-shake correcting system provided with the variable angle prism 341 as image-shake correcting means.

The arrangement shown in FIG. 28 includes the variable angle prism 341, apex-angle sensors 343 and 344, amplification circuits 353 and 354 for amplifying the outputs of the respective apex-angle sensors 343 and 344, a microcomputer 345, vibration detecting means 346 and 347 each of which is formed by an angular-acceleration sensor or the like, actuators 348 and 349 each of which is made up of the aforesaid constituent elements 335 to 338, and a lens 352.

The microcomputer 345 determines currents to be supplied to the respective actuators 348 and 349, to control the variable angle prism 341 to place it into an optimal angular state optimal for elimination of an image shake, according to the angular states of the variable angle prism 341 detected by the respective apex-angle sensors 343 and 344 and detection results provided by the respective vibration detecting means 346 and 347.

Incidentally, in the shown arrangement, major elements are each prepared as a pair of blocks on the assumption that control operations relative to two directions which are 90 degrees offset from each other are independently performed.

The image-shake correcting system using the variable angle prism has been described above.

A so-called "pixel shift" is one well-known method for producing a high-resolution image by using a solid-state image pickup element. In an image pickup apparatus using a solid-state image pickup element, the resolution of an image depends on the density of pixels, and as the number of pixels which constitute one picture is made larger, it is possible to provide a higher-resolution image. In recent years, the density of pixels per solid-state image pickup element has been remarkably increased, and a high-density solid-state image pickup element having 410,000 pixels for a picture size of ⅓ inch or 270,000 pixels for a picture size of ¼ inch has already been achieved against the background of an improvement in the precision of a manufacturing process for solid-state image pickup elements.

However, in terms of manufacture, it is difficult to make the density of pixels higher to produce a higher-resolution image, and a trade-off is needed between an increase in the density of pixels and a decrease in the sensitivity of a solid-state image pickup element.

Another available method is to increase the number of pixels per picture by increasing the picture size to ½ inch or ⅔ inches. However, this method involves an increase in the entire size of a camera, particularly a lens part thereof, and may impede the development of a domestic apparatus having a reduced size which is an important requirement in the field of domestic apparatuses.

Still another available method is to employ a plurality of (two or three) solid-state image pickup elements. This method also involves an increase in the entire size of a camera, and further requires difficult adjustments of the alignment of the solid-state image pickup elements.

In contrast, the method for increasing the resolution of an image by means of the "pixel shift" is intended to increase such resolution by combining images obtained by shifting the image by ½ of a pixel pitch. This method can overcome the disadvantages of the above-described methods.

One method for shifting an image for the purpose of pixel shift is disclosed in Japanese Laid-Open Patent Application No. Sho 58-195369. According to this method, a transparent substance layer made of a transparent material, such as plastics or glass, is provided between a lens system and an image pickup part, and a piezoelectric element made of polyvinyl fluoride or the like is attached to the periphery of the transparent substance layer so that the incidence angle of a light ray can be varied by the application of voltage.

A paper entitled "SWING CCD IMAGE SENSOR" and published in the Journal of the Institute of Television Engineers of Japan, Vol. 137, No. 10 (1983) discloses another method of swinging a solid-state image pickup element by using a bimorph piezoelectric element.

Japanese Laid-Open Patent Application No. Hei 3-276981 discloses a method of turning a transparent refracting plate in front of an image pickup element by an amount corresponding to 1/an integer of a pixel pitch, by using a stopping motor.

Japanese Laid-Open Patent Application No. Sho 6-1191166 discloses a method of varying the angle of a light ray by means of a variable angle prism disposed in front of an image pickup element, in which prism a transparent elastic element made of silicone rubber is sandwiched between glass plates.

The aforesaid image-shake correcting system which corrects an image shake due to a vibration of a hand by using the variable angle prism is known and has already been provided as a product.

The aforesaid method for increasing the resolution of an image by means of the pixel shift has also already been applied to a product.

If a higher-quality image is to be obtained by performing both image-shake correction and pixel shift in one image pickup apparatus, the image pickup apparatus needs to have at least two variable angle prisms, one for the image-shake correction and the other for the pixel shift. This arrangement involves an increase in the entire size of the apparatus and incurs an increase in cost.

Therefore, a fifth object of the present invention which is represented by sixth to tenth embodiments which will be described later is to provide an image pickup apparatus capable of producing a high-quality image by performing both an image-shake correcting operation and the operation of moving an image by a predetermined amount relative to a pixel pitch, without incurring an increase in the entire size of the apparatus or an increase in cost.

A sixth object of the present invention is to provide an image pickup apparatus capable of not only achieving the above-described fifth object of the present invention, but also selecting a function which is suited to an intention of a user.

A seventh object of the present invention is to provide an image pickup apparatus capable of not only achieving the above-described fifth object of the present invention, but also performing the operation of moving an image by a predetermined amount relative to a pixel pitch, without being adversely influenced by a particular focal length, even in an arrangement in which light-flux deflecting means which serves as actuating means is disposed on an optical path in front of at least a part of a lens capable of varying its focal length.

An eighth object of the present invention is to provide an image pickup apparatus capable of not only achieving the above-described seventh object of the present invention, but also varying the focal length without hindering the operation of producing a high-quality image by the aforesaid image-shake correcting operation and the aforesaid operation of moving an image by a predetermined amount.

A ninth object of the present invention is to provide an image pickup apparatus capable of not only achieving the above-described seventh object of the present invention, but also preventing the production of a high-quality image from being hindered by the aforesaid image-shake correcting operation and the aforesaid operation of moving an image by a predetermined amount, even in an arrangement in which driving means for performing stepwise driving is employed as means for actuating the actuating means.

A tenth object of the present invention is to provide an image pickup apparatus capable of not only achieving the above-described fifth embodiment of the present invention, but also producing a high-quality image by stably performing storage of a formed image during the operation of moving an image by a predetermined amount relative to a pixel pitch.

To achieve the fifth object of the present invention, in accordance with the sixth embodiment, there is provided an arrangement which includes actuating means for varying an image forming position with respect to an image forming plane and control means for causing the actuating means to perform a first operation for correcting an image shake and a second operation for moving an image formed in the image forming plane, by a predetermined amount relative to a pixel pitch of the image forming plane. According to the arrangement, merely by preparing one actuating means as the actuating means, it is possible to achieve both an image-shake correcting operation and the operation of moving an image by the predetermined amount relative to the pixel pitch of the image forming plane.

To achieve the sixth object, in accordance with one aspect of the embodiments which will be described later, there is provided an arrangement which also includes selecting means for selecting at least either one of the first and second operations. The control means is arranged to cause the actuating means to perform an operation selected by the selecting means, and is capable of selecting an appropriate function.

To achieve the seventh object, in accordance with another aspect of the embodiments which will be described later, there is provided an arrangement in which the light-flux deflecting means disposed in front of at least a part of the lens capable of varying the focal length is used as the actuating means, and the focal length is related to the aforesaid second operation. In this arrangement, it is possible to prevent the second operation performed by the light-flux deflecting means from being adversely influenced by a particular focal length.

To achieve the seventh object, in accordance with another aspect of the embodiments which will be described later, there is provided an arrangement in which the state of the second operation is made to vary according to the focal length of the lens. In this embodiment, it is possible to perform the second operation in a state which is suited to each individual focal length of the lens.

To achieve the seventh object, in accordance with another aspect of the embodiments which will be described later, there is provided an arrangement in which the focal length of the lens is controlled according to the state of the second operation, it is possible to perform the second operation at a focal length which is suited to the second operation.

To achieve the eighth object, in accordance with another aspect of the embodiments which will be described later, there is provided an arrangement in which the amount of driving of the light-flux deflecting means for moving an image by the predetermined amount in the second operation is made to vary according to the focal length of the lens. In this arrangement, it is possible to prevent the quality of an image from being impaired by a variation of the focal length.

To achieve the eighth object, in accordance with another aspect of the embodiments which will be described later, there is provided an arrangement in which the second operation is restricted according to the focal length of the lens. In this arrangement, the second operation is appropriately performed even at a focal length which is not suited to the second operation, so that it is possible to prevent the second operation from inappropriately working.

To achieve the ninth object, in accordance with another aspect of the embodiments which will be described later, there is provided an arrangement which includes driving means for stepwise driving the light-flux deflecting means and is arranged to vary, according to the focal length of the lens, the number of driving steps in which the driving means stepwise drives the light-flux deflecting means to move an image by the predetermined amount relative to a pixel pitch in the second operation. According to this arrangement, it is possible to retain a high-quality image even if such driving means for performing stepwise driving is employed.

To achieve the ninth object, in accordance with another aspect of the embodiments which will be described later, there is provided an arrangement which includes driving means for stepwise driving the light-flux deflecting means and is arranged to determine the focal length according to whether the second operation is to be performed. In this arrangement, the second operation can be performed at a focal length which is suited to the second operation, by stepwise driving the light-flux deflecting means. Accordingly, even if the second operation is performed by stepwise driving, a high-quality image can always be produced.

To achieve the tenth object, in accordance with another aspect of the embodiments which will be described later, there is provided an arrangement which includes storage means for performing storage of an image formed in an image forming plane. The control means is arranged to control the light-flux deflecting means so that the light-flux deflecting means can perform the second operation outside the time that the storage means performs storage of the image. According to this arrangement, since the second operation of moving an image can be prevented from adversely influencing the storage of the image, it is possible to provide an image pickup element capable of always producing a high-quality image.

[Sixth Embodiment]

Figure 10:
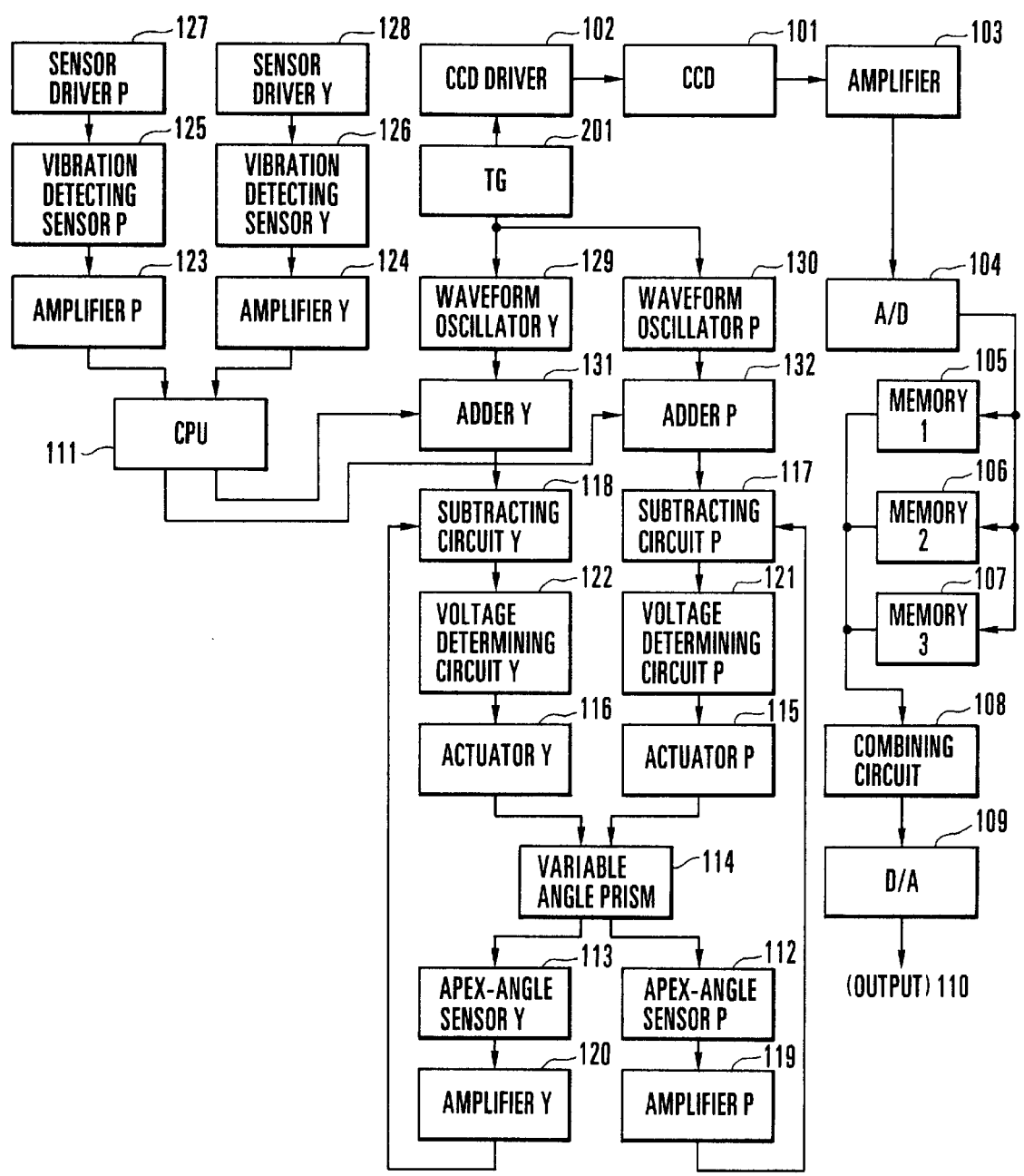
FIG. 10 is a block diagram schematically showing the arrangement of an image pickup apparatus according to a sixth embodiment of the present invention.

FIG. 10 is a block diagram showing the arrangement of the image pickup apparatus according to the sixth embodiment of the present invention. The image pickup apparatus shown in FIG. 10 includes a solid-state image pickup element 101 such as a CCD, a driver 102 for the solid-state image pickup element 101, a timing generator (TG) 201, an amplifier 103 for amplifying a video signal obtained from the solid-state image pickup element 101, an A/D converter 104, image memories 105, 106 and 107, a combining circuit 108, a D/A converter 109, a CPU 111, and an apex-angle sensor 112 for detecting a pitch-directional state of the apex angle of a variable angle prism 114. The apex-angle sensor 112 is made up of, for example, a light emitting element and a light receiving element, as described above. Incidentally, reference numeral 110 denotes a signal output to a recorder or the like.

The image pickup apparatus shown in FIG. 10 also includes an apex-angle sensor 113 for detecting a yaw-directional state of the apex angle of the variable angle prism 114, the variable angle prism 114, an actuator 115 for driving the variable angle prism 114 in the pitch direction, an actuator 116 for driving the variable angle prism 114 in the yaw direction, a subtracting circuit 117 for calculating a difference between a target apex angle and an actual apex angle in the pitch direction, a subtracting circuit 118 for calculating a difference between a target apex angle and an actual apex angle in the yaw direction, an amplifier 119 for amplifying an output value of the pitch-directional, apex-angle sensor 112, and an amplifier 120 for amplifying an output value of the yaw-directional, apex-angle sensor 113.

The shown image pickup apparatus also includes a voltage determining circuit 121 for determining a voltage to be applied to the actuator 115, on the basis of the output of the pitch-directional, subtracting circuit 117, a voltage determining circuit 122 for determining a voltage to be applied to the actuator 116, on the basis of the output of the yaw-directional, subtracting circuit 118, a driver 127 for a pitch-directional vibration detecting sensor 125, a driver 128 for a yaw-directional vibration detecting sensor 126, the pitch-directional vibration detecting sensor 125, and the yaw-directional vibration detecting sensor 126. (As described previously, a vibration gyro or the like is used for each of the vibration detecting sensors 125 and 126.)

The shown image pickup apparatus also includes an amplifier 123 for amplifying an output of the pitch-directional vibration detecting sensor 125, an amplifier 124 for amplifying an output of the pitch-directional vibration detecting sensor 126, a waveform oscillator 129 for driving the variable angle prism 114 for the purpose of performing a pixel shift in the yaw direction, a waveform oscillator 130 for driving the variable angle prism 114 for the purpose of performing a pixel shift in the pitch direction, and adders 131 and 132.

The operation of the arrangement shown in FIG. 10 will be described below. First of all, the drivers 127 and 128 drive the respective vibration detecting sensors 125 and 126 for the purpose of image-shake correction. A known example of each of the vibration detecting sensors 125 and 126 is a piezoelectric vibration gyro which is arranged to drive a piezoelectric element attached to a resonator at the resonance frequency thereof and detect a Coriolis force on the basis of the output of the piezoelectric element. The respective outputs of the vibration detecting sensors 125 and 126 are amplified by the amplifiers 123 and 124 and inputted to the CPU 111.

If the variable angle prism 114 is driven in accordance with the detection results provided by the vibration detecting sensors 125 and 126, the image-shake correction is basically completed. In practice, however, in order to mitigate the visual unnaturalness of a moving image to be recorded, the CPU 111 performs various processes, such as the processing of disabling the variable angle prism 114 from responding to the outputs of the respective vibration detecting sensors 125 and 126 if the vibration detecting sensors 125 and 126 have detected an abrupt vibration caused by a start of panning. (Since such processes are known, they are not described herein in detail.) By moving the variable angle prism 114 in response to the output of the CPU 111 in this manner, the image-shake correction is effected. The blocks 111 and 123 to 138 constitute vibration detecting means.

Image-shake correcting means is constituted of the blocks 112 to 122.

Then, to correct an image shake due to the vibration detected by the vibration detecting means, the CPU 111 output signals corresponding to pitch- and yaw-directional apex-angle positions to be taken by the variable angle prism 114, and these signals are respectively inputted to the subtracting circuits 117 and 118 via the adders 131 and 132. In the meantime, the respective apex-angle sensors 112 and 113 detect the pitch- and yaw-directional states of the apex angle of the variable angle prism 114. The outputs of the respective apex-angle sensors 112 and 113 which correspond to the pitch- and yaw-directional apex-angle positions are amplified by the amplifiers 119 and 120, and the signals outputted from the amplifiers 119 and 120 are respectively inputted to the subtracting circuits 117 and 118. Accordingly, the subtracting circuit 117 outputs a signal according to the difference between a target apex-angle position and an actual apex-angle position in the pitch direction, while the subtracting circuit 118 outputs a signal according to the difference between a target apex-angle position and an actual apex-angle position in the yaw direction. According to the difference signals, the voltage determining circuits 121 and 122 respectively determine voltages to be applied to the actuators 115 and 116 for driving the variable angle prism 114. The thus-determined voltages are respectively applied to the actuator 115 and 116, whereby image-shake correction is effected in the above-described manner.

In the above-described arrangement, each of the adders 131 and 132 is provided for combining the driving required for correcting an image shake with the driving required for increasing the resolution of an image. Specifically, the adders 131 and 132 respectively receive yaw- and pitch-directional apex-angle target values for image-shake correction from the CPU 111, as well as yaw- and pitch-directional apex-angle target values for pixel shift from the waveform oscillators 129 and 130. The adders 131 and 132 respectively add the yaw- and pitch-directional apex-angle target values for image-shake correction to the yaw- and pitch-directional apex-angle target values for pixel shift. Incidentally, each of the waveform oscillators 129 and 130 is arranged to output a waveform signal for pixel shift which is synchronized with a signal outputted from the TG 201 for determining the timing of driving the CCD driver 102 and which is capable of providing a predetermined pixel shift for each picture.

Each of the adders 131 and 132 may contain a switch part so that it can selectively perform the operation of adding an apex-angle target position for image-shake correction to an apex-angle target position for pixel shift and the operation of outputting either one of them. In this arrangement, for example if an image-shake correction function is turned off, it is possible to drive the variable angle prism 114 by using only a signal for increasing the resolution of an image.

Incidentally, the blocks 129 to 132 may be provided in the CPU 111.

[Seventh Embodiment]

A seventh embodiment relates to an arrangement in which a variable angle prism is disposed in the forefront of a photographic lens (zooming lens). In the case of such an arrangement or an arrangement in which a variable angle prism is disposed within or after a front lens group (in front of a variator), it is necessary to vary an amplitude according to the focal length of the zooming lens for the purpose of effecting a pixel shift. However, in this case, as the focal length becomes closer to a telephoto end, the precision of angle control becomes lower.

In other words, even if the apex angle of the variable angle prism is varied by an equal amount, the amount of movement of an image in a photographic image plane will vary with the focal length of the zooming lens.

In an image-shake correcting operation, the vibration angle of a camera is detected and light rays are deflected by the detected vibration angle. In an arrangement in which a variable angle prism is disposed after a zooming lens (variator lens), it is, therefore, necessary to vary the target angle of the variable angle prism according to the focal length of the zooming lens even with respect to the same vibration angle. However, if the variable angle prism is disposed in front of the zooming lens, as in the case of the seventh embodiment, the focal length can be neglected.

Accordingly, only when a target apex-angle position for pixel shift is to be determined, it is necessary to correct the target apex angle of the variable angle prism according to the focal length.

Figure 11:
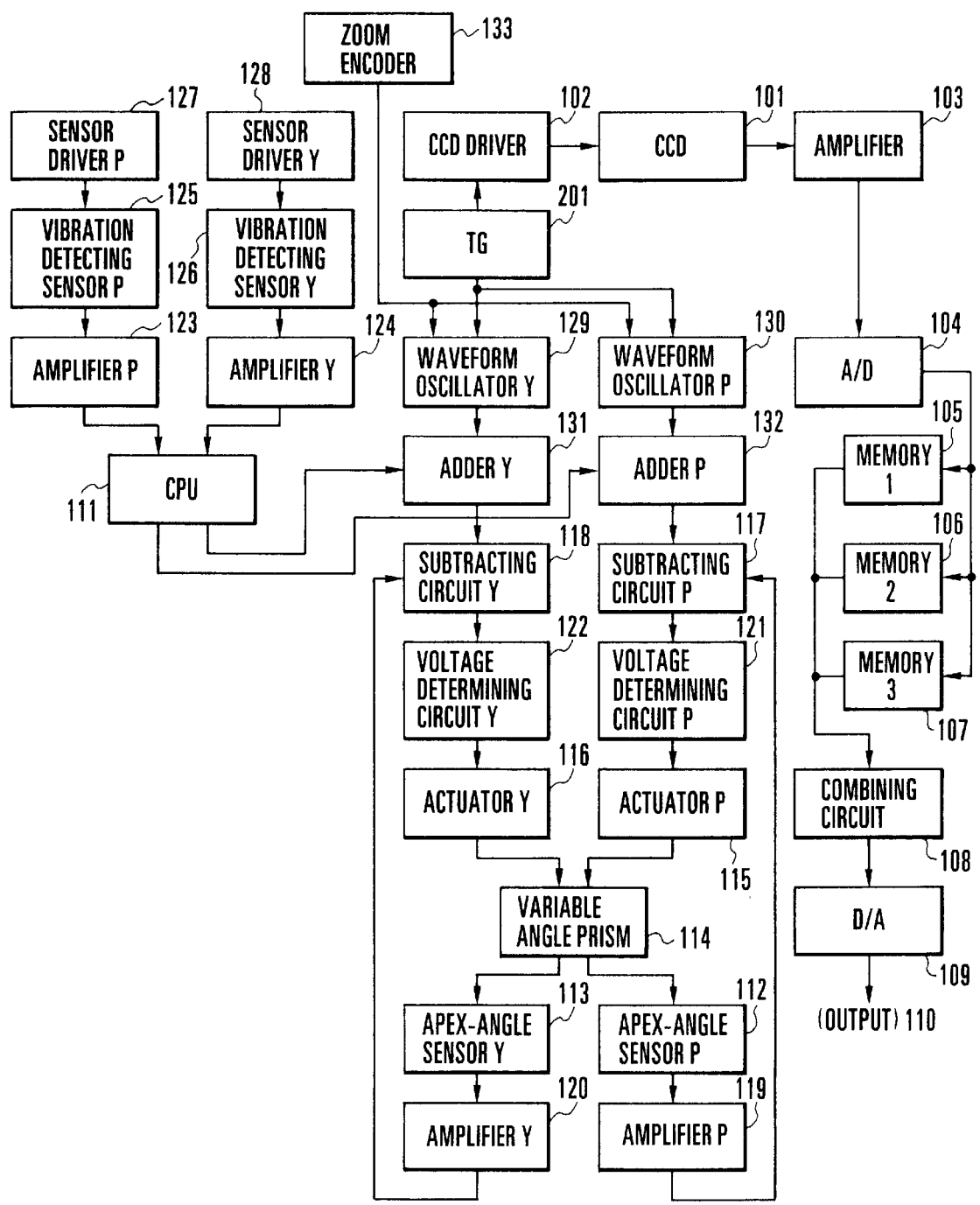
FIG. 11 is a block diagram schematically showing the arrangement of an image pickup apparatus according to a seventh embodiment of the present invention.

FIG. 11 is a block diagram showing the arrangement of an image pickup apparatus according to the seventh embodiment which is intended to correct the target position for pixel shift of a variable angle prism according to the focal length. In FIG. 11, identical reference numerals are used to denote parts identical to those shown in FIG. 10. The arrangement shown in FIG. 11 newly includes a zoom encoder 133, and the output of the zoom encoder 133 is inputted to the waveform oscillators 129 and 130.

Specifically, to obtain an identical amount of pixel shift, it is only necessary to linearly control the amount of variation of the apex angle according to a zoom ratio (so that the amount of variation of the apex angle can be made smaller toward a wide-angle end).

[Eighth Embodiment]

In a video camera or the like in which the sixth embodiment of the present invention is practiced, if a small amount of image movement for pixel shift is recorded as an image, a degraded image, such as a blurred image, will occur.

To solve such a problem, according to the eighth embodiment, the following control is performed.

(i) The timing of driving the variable angle prism for the purpose of pixel shift is made different from the storage time of a CCD.

(ii) To carry out the above (i), a shutter speed is shifted to a higher-speed side to allocate a longer time for the driving of the variable angle prism.

Figure 12:
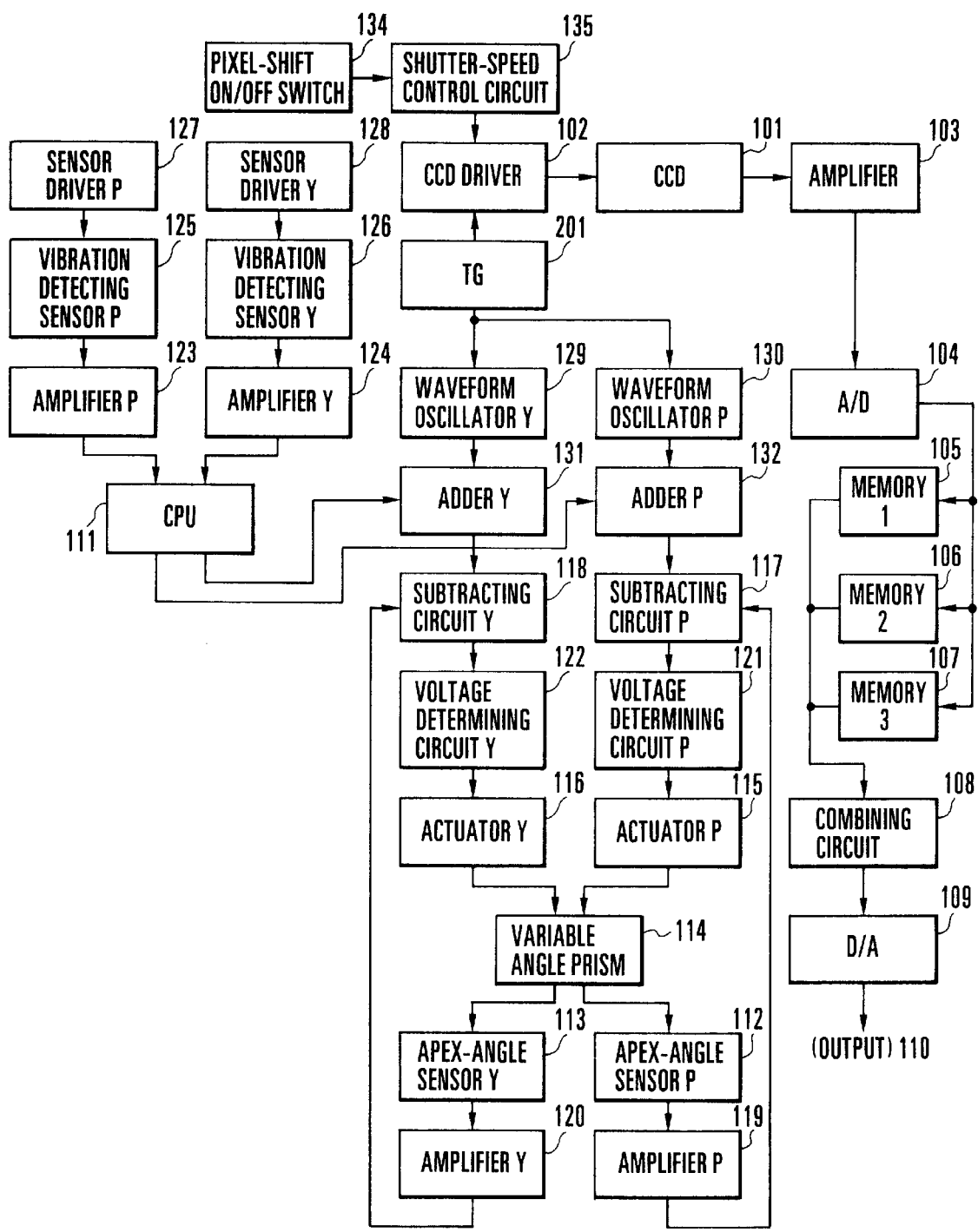
FIG. 12 is a block diagram schematically showing the arrangement of an image pickup apparatus according to an eighth embodiment of the present invention.

FIG. 12 is a block diagram showing the arrangement of an image pickup apparatus according to the eighth embodiment of the present invention. In FIG. 12, identical reference numerals are used to denote parts identical to those shown in FIG. 10. The arrangement shown in FIG. 12 newly includes an on/off switch 134 for turning on or off a pixel shifting function and a control circuit 135 for controlling the shutter speed (storage time).

In operation, if the pixel shifting function is turned on at the on/off switch 134, the control circuit 135 increases the shutter speed, for example, from a normal 1/60 second to 1/100 second, according to the output result of the on/off switch 134.

Figure 13:
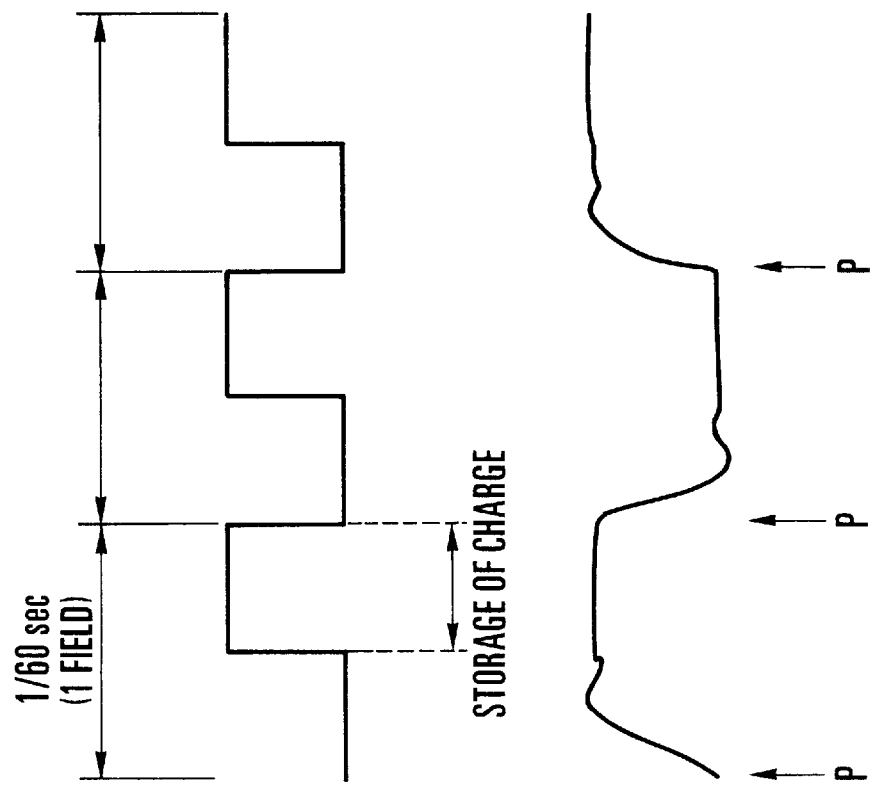
FIGS. 13(A) and 13(B) are timing charts showing the operation of the arrangement of FIG. 12 of the present invention.

FIGS. 13(A) and 13(B) are timing charts of the above-described operation. FIG. 13(A) shows the timing of storing an image in a CCD, and FIG. 13(B) shows the timing of varying a target apex angle for pixel shift. The image pickup apparatus according to the eighth embodiment is assumed to be a video camera which conforms to the NTSC system in which one field scanning period is 1/60 second. As shown in FIG. 13(A), the second half of one field period (approximately 1/120 second) is allocated for the image storage timing of the CCD. In addition, as shown in FIG. 3(B), the target apex angle for pixel shift is made to vary at each timing indicated by P, so that each operation of varying the target apex angle is completed before the next storage is started.

[Ninth Embodiment]

Figure 14:
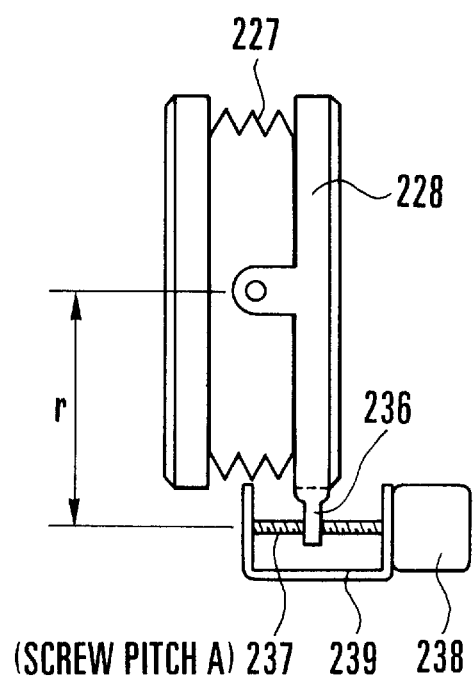
FIG. 14 is a schematic view of the arrangement of the essential portion of an image pickup apparatus according to a ninth embodiment of the present invention.

In a conventional example, a moving-coil type of motor is used as an actuator for driving a variable angle prism. In a ninth embodiment, a stepping motor is employed as such an actuator. FIG. 14 is a schematic view showing the arrangement of the essential portion of an image pickup apparatus according to the ninth embodiment of the present invention. The arrangement shown in FIG. 14 includes a bellows portion 227 of a variable angle prism, a holding frame 228 for holding the variable angle prism, and a rack 236 integrally provided on the holding frame 228. An output shaft 237 of a stepping motor is externally threaded with a predetermined pitch and is meshed with the rack 236. A metal plate 239 supports a stepping-motor body 238 and has bearing portions for the output shaft 237. As the output shaft 237 rotates by a predetermined step angle, the rack 236 moves forward or backward, so that the holding frame 228 of the variable angle prism turns about its rotational axis.

In an arrangement in which a stepping motor is employed as an actuator in the above-described manner, the minimum amount of control required for varying the apex angle of a variable angle prism corresponds to an angle which varies with a one-step turn of the output shaft of the stepping motor.

More specifically, $$\Delta T \approx \tan^{-1} \frac{1}{r} \times \left( \frac{\Delta \theta}{2\pi} \times A \right) \quad (1)$$

where $\Delta\theta$ (cad/step) represents the one-step turn of the output shaft 237 of the stepping-motor body 238; A (mm) represents the screw pitch of the output shaft 237; r represents the distance between the rotational axis of the variable angle prism and the position at which the rack 236 and the output shaft 237 are meshed with each other; and $\Delta T$ represents the angle of the variable angle prism which varies with the one-step turn of the output shaft 237 of the stepping-motor body 238. As can be seen from Expression (1), it is impossible to vary the apex angle by a small angle not greater than the angle $\Delta T$. Also, an apex-angle variation of not less than the angle $\Delta T$ is represented by $n \cdot \Delta T$ (n is the number of steps).

In an arrangement in which a variable angle prism is disposed in front of a photographic lens, if B represents the amount of movement of an image in an image forming plane and f represents a focal length, the relation between the apex-angle variation $n \cdot \Delta T$ and the amount of movement, B, of the image is represented as:

$$B \approx f \times n \cdot \Delta T \text{ (where } n \cdot \Delta T \text{ is a small angle)}$$

In other words, the amount B by which the image moves in the image forming plane with the apex-angle variation $n \cdot \Delta T$ has a linear relation to the focal length f.

Figure 15:
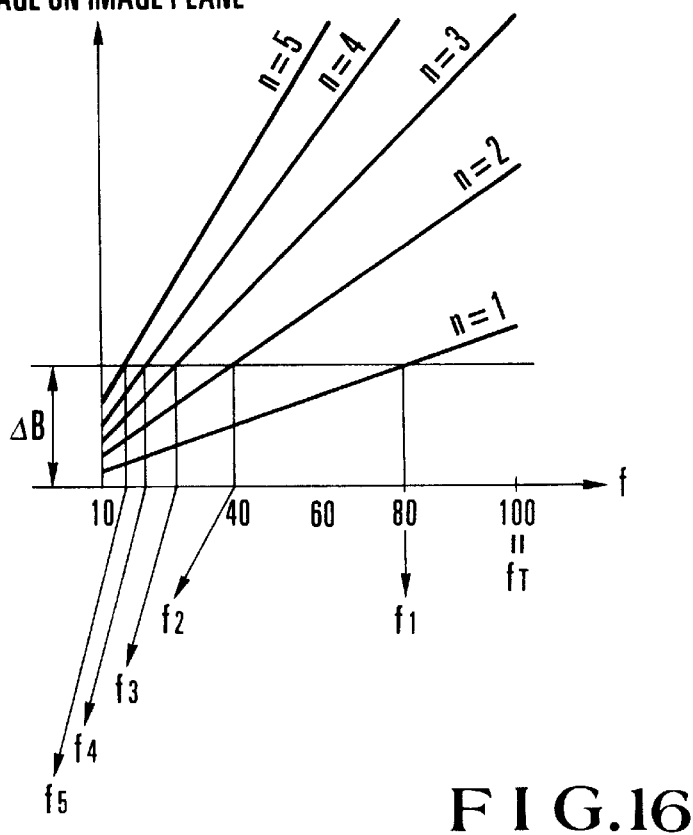
FIG. 15 is a graph showing the relation between the amount of movement of an image and the focal length.

FIG. 15 is a graph showing the relation between the focal length f and the amount of movement, B, of the image in the image forming plane in the case of n=1 to 5. In FIG. 15, the horizontal axis represents the focal length f, while the vertical axis represents the amount of movement, B, of the image. As can be seen from FIG. 15, in the case of a 10× zoom the focal length f of which is, for example, 10 mm at its wide-angle end and 100 mm at its telephoto end, the amount of movement of the image at f=100 mm is ten times as large as the amount of movement of the image at f=10 mm for the same n.

Assuming that $\Delta B$ represents the amount of movement of an image which is required for pixel shift (for example, if $\Delta B$ corresponds to a ½ pixel), as can be seen from the example shown in FIG. 15, if no appropriate design value is selected as the angle $\Delta T$, the amount of movement of the image will be greater than the desired amount $\Delta B$ of pixel shift in the focal-length range of $f_1$–$f_T$ (in this example, $f_1$=100 mm) even in the case of a driving for a minimum step of n=1. In the focal-length range of $f_2$–$f_1$, the amount of movement of the image is above the desired amount $\Delta B$ for n=2 and is below the desired amount $\Delta B$ for n=1.

To solve the above-described phenomenon, the ninth embodiment presents three technical concepts: (i) the concept of setting the desired amount $\Delta B$ of pixel shift so that a pixel shift can be performed within an error range of ±x % with respect to the desired amount $\Delta B$ of pixel shift over the entire focal-length range; (ii) the concept of using only a focal length at which the desired amount of pixel shift can be attained; and (iii) the concept of restricting an available focal-length range to inhibit the use during a pixel shift of a focal-length range in which a large error occurs in the desired amount $\Delta B$ of pixel shift or to automatically turn off a pixel shifting function in such a focal-length range.

If only the amount of pixel shift can be taken into account, it may be possible to eliminate all substantial errors from the desired amount $\Delta B$ of pixel shift over the entire focal-length range merely by setting the angle $\Delta T$ to a fully small value. However, since the speed of variation of an apex angle becomes slow which can be obtained when a stepping motor runs at an available maximum speed Vmax (PPS) which can be reached under predetermined conditions, it will be impossible to obtain the speed needed to correct an image shake.

Figure 16:
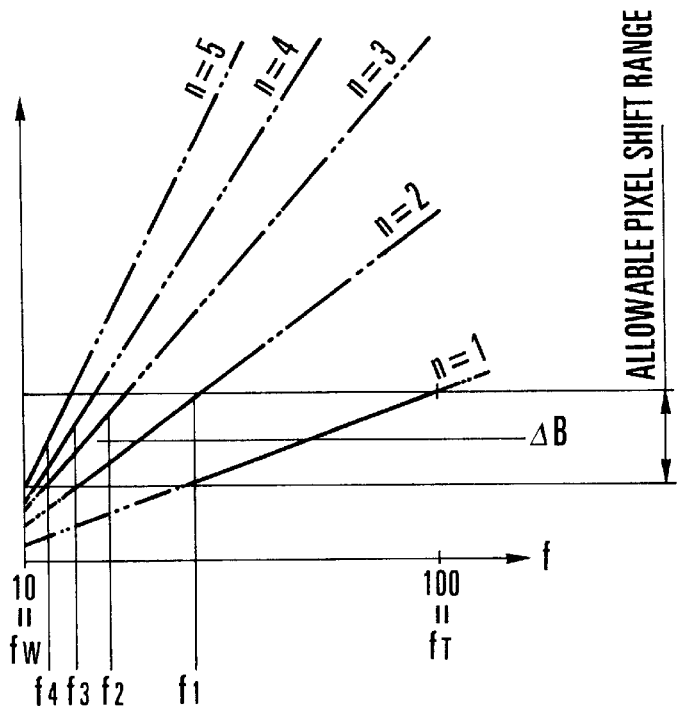
FIG. 16 is a graph showing the relation between the amount of movement of an image and the focal length within an allowable pixel shift range.
Figures 17, 18:
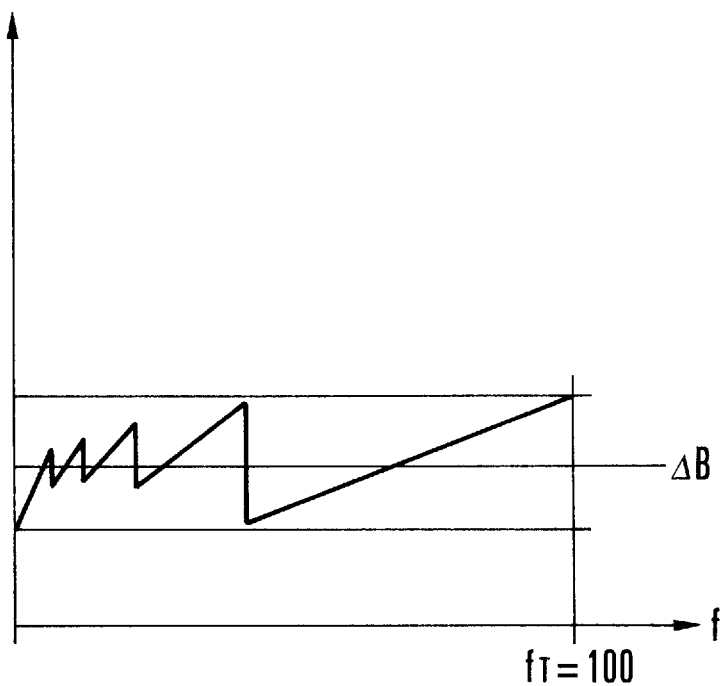
FIG. 17 is a table showing the relation between the focal length and the value of n for pixel shift.
FIG. 18 is a graph showing the relation between the focal length and the value of n for pixel shift.

FIG. 16 shows the manner in which the amount of pixel shift is accommodated into an allowable pixel shift range over the entire focal-length range shown in FIG. 15. As shown in FIG. 16, the range in which it is possible to allow a predetermined error of the desired amount $\Delta B$ of pixel shift is set as the allowable pixel shift range. As can be seen from FIG. 16, n=1 is set in the focal-length range of $f_1$–$f_T$, while n=2 is set in the focal-length range of $f_2$–$f_1$. FIG. 17 is a table showing several settings of n according to different focal lengths.

FIG. 18 is a graph corresponding to the table of FIG. 17, and shows the relation between actually obtained focal lengths and the amount of pixel shift.

Figure 19:
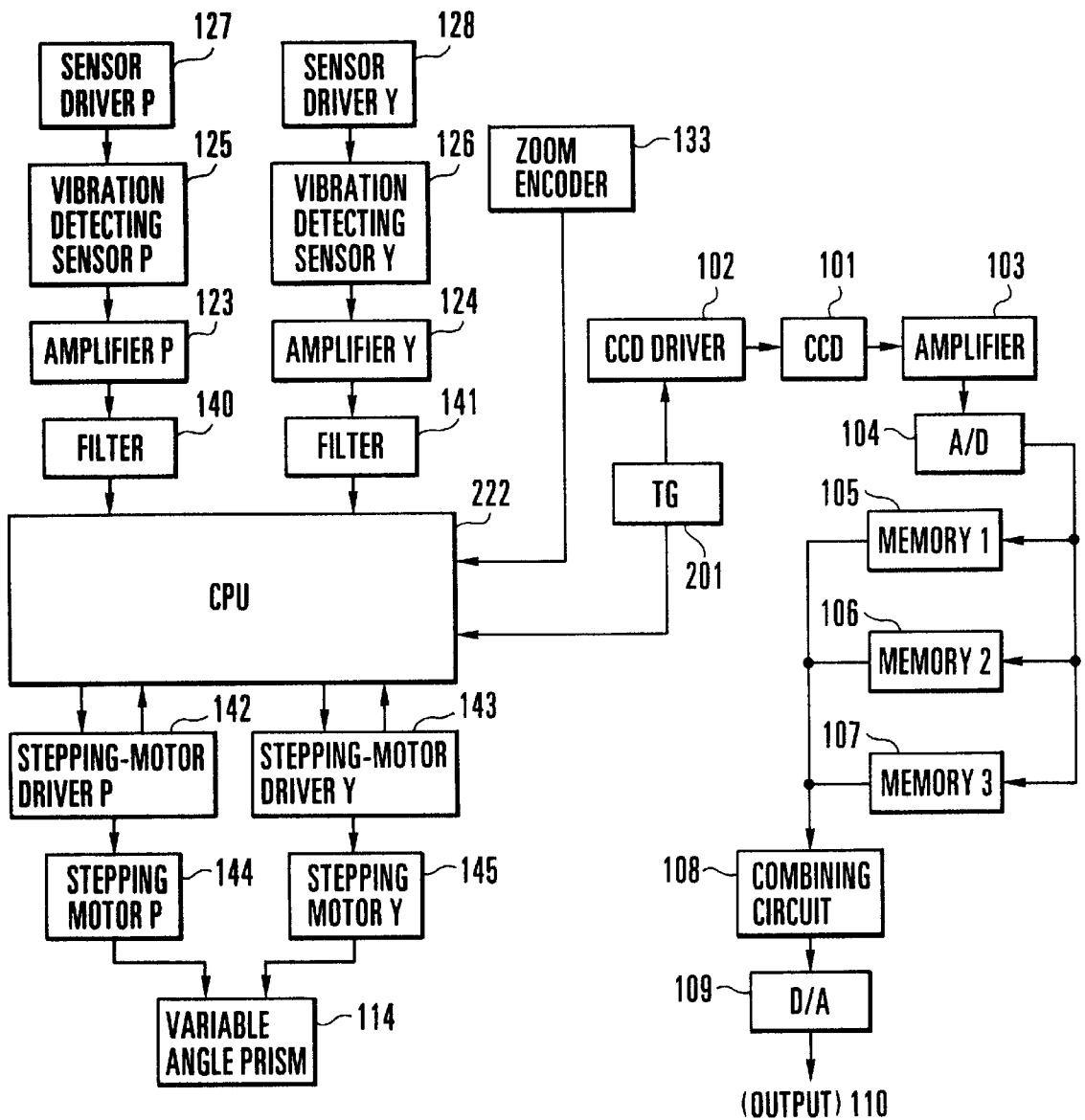
FIG. 19 is a block diagram schematically showing the arrangement of the image pickup apparatus according to the ninth embodiment of the present invention.

FIG. 19 is a block diagram of the arrangement of the ninth embodiment. Incidentally, as is known, in an arrangement in which the number of input pulses of a stepping motor is utilized as data for an absolute-position encoder, a moving element (in the ninth embodiment, the variable angle prism 114) is first set to a count starting position (for example, a position at which two glass plates of the variable angle prism 114 are parallel to each other). When the moving element is driven to start from the count starting position, the number of input pulses of the stepping motor is continuously counted. In this case, to confirm whether the moving element has moved to the count starting position, it is necessary to separately provide means for detecting whether the moving element has moved to the count starting position. The means may use a photointerruptor, a leaf switch or the like. In such an arrangement, a CPU 222 continuously counts the number of steps inputted from each of stepping-motor drivers 142 and 143 to a respective one of stepping motors 144 and 145, thereby detecting the state of the apex angle of the variable angle prism 114.

The CPU 222 receives vibration detection results passed through filters 140 and 141, focal-length information sent from a zoom encoder 133, a driving timing signal sent from the timing generator (TG) 201 for determining the timing of driving the CCD 101, and the number of input pulses of each of the stepping motors 144 and 145 which indicates the state of the apex angle of the variable angle prism 114.

The CPU 222 controls the driving of the variable angle prism 114 on the basis of these items of information. Particularly when a driving for pixel shift is to be executed, the CPU 222 determines the value of n on the basis of its memorized table corresponding to FIG. 17, on the basis of the focal-length information sent from the zoom encoder 133, and in synchronism with the timing of driving the CCD 110 sent from the timing generator (TG) 201, thereby driving the variable angle prism 114 for the purpose of pixel shift for n pulses.

Figure 20:
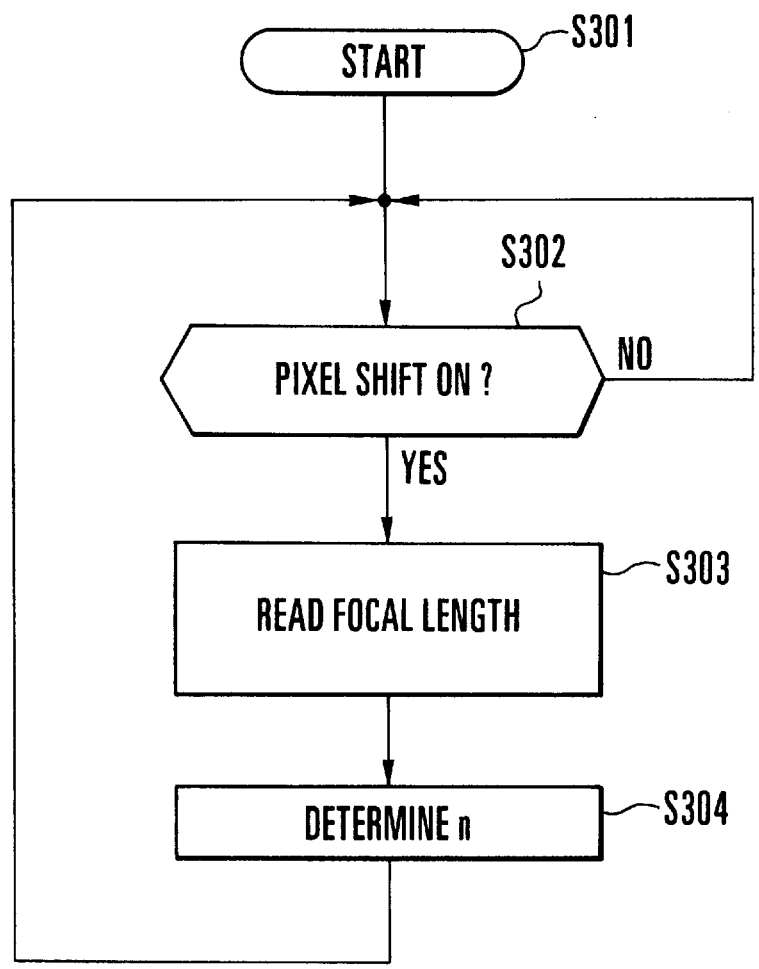
FIG. 20 is a flowchart showing control to be executed by a CPU 222 of FIG. 19.

FIG. 20 is a flowchart showing the process of determining the value of n in the CPU 222.

The process starts in Step S301. In Step S302, it is determined whether a driving for pixel shift needs to be executed. If it is determined that a driving for pixel shift needs to be executed, the current focal length is read in Step S303. Then, in Step S304, the value of n is determined on the basis of the read focal length as well as the table corresponding to FIG. 17, which is provided in the CPU 222. If no driving for pixel shift needs to be executed, the process does not proceed from Step S302.

Figure 21:
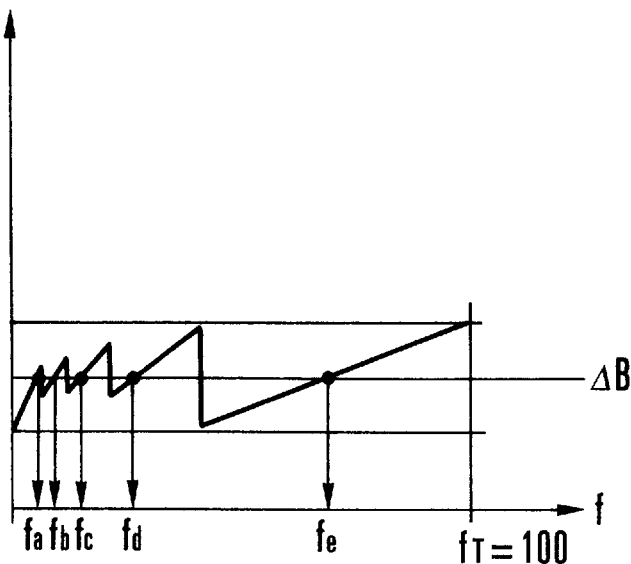
FIG. 21 is a graph aiding in describing the operation of a modification of the ninth embodiment of the present invention.

A modification of the ninth embodiment of the present invention will be described below. In a case where there is no allowable pixel shift range into which to accommodate the amount of pixel shift, or in a case where, because of a small allowable pixel shift range, the angle ΔT is extremely small so that the amount of pixel shift cannot be accommodated into the allowable pixel shift range, it is preferable to restrict settable focal lengths to prevent an influence from being exerted on the performance of an image-shake correcting system. FIG. 21 is a view showing the operation of the modification which is arranged in the above-described manner. By selecting a focal length for the number of driving pulses inputted to the stepping motor for pixel shift, as shown in FIG. 21, like $f_e$ for n=1, $f_d$ for n=2, $f_c$ for n=3 and $f_b$ for n=4, it is possible to provide a desired amount of pixel shift free of error.

Specifically, it is preferable to adopt an arrangement which is arranged to set the focal length $f_e$ if zooming from the focal length $f_d$ toward a telephoto side is performed or to set the focal length $f_c$ if zooming from the focal length $f_d$ toward a wide-angle side is performed.

Figure 22:
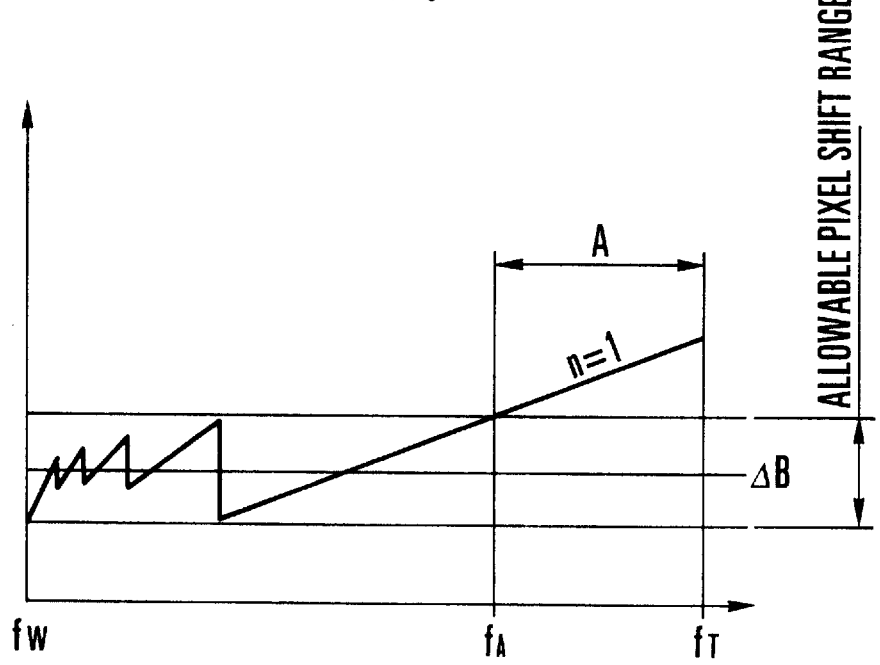
FIG. 22 is a graph aiding in describing the operation of a modification of the ninth embodiment of the present invention.

FIG. 22 is a view showing the operation of a further modification of the ninth embodiment. In the case shown in FIG. 22, if an arbitrary value is set as the angle ΔT, the amount of pixel shift exceeds an allowable pixel shift range in an area A which extends into a telephoto side from the line of a focal length $f_A$, even if n=1 which is a minimum variation of the apex angle of a variable angle prism. To solve this problem, it is preferable to adopt an arrangement which, if a pixel shifting function is on, does not employ any focal length contained in the area A.

For example, it is preferable to adopt an arrangement in which:

(i) if the pixel shifting function is turned on when the focal length of a photographic lens is within the area A, the focal length is forcedly set to $f_A$; and (ii) if zooming toward the telephoto side is performed when the pixel shifting function is on and the focal length is within the area A, the zooming is made to stop at $f_A$.

[Tenth Embodiment]

Figure 23:
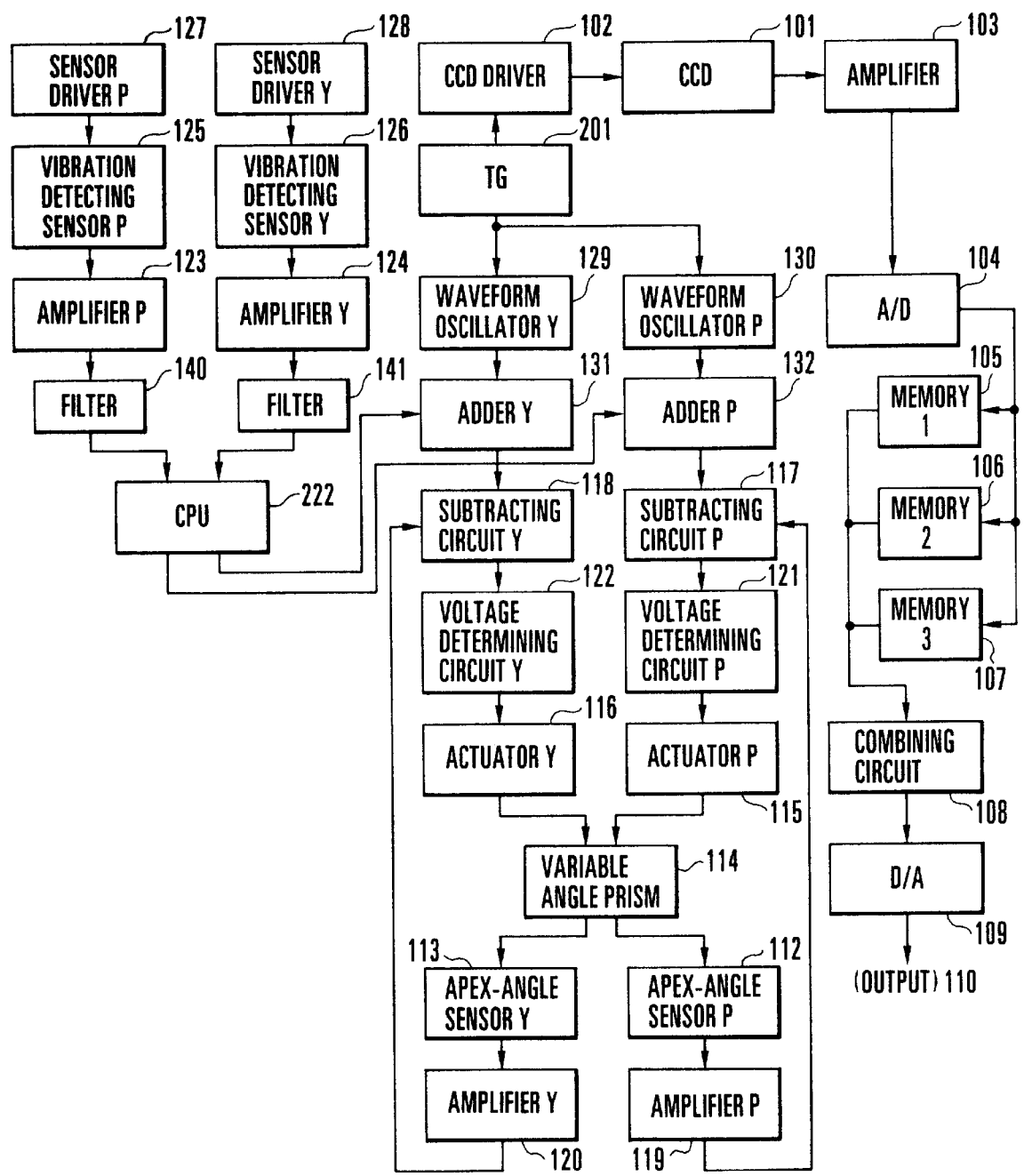
FIG. 23 is a block diagram schematically showing the arrangement of an image pickup apparatus according to a tenth embodiment of the present invention.

FIG. 23 is a block diagram showing the arrangement of a tenth embodiment of the present invention. The tenth embodiment is a modification of the sixth embodiment, and the block diagram of FIG. 23 is a modification of the block diagram (FIG. 10) of the sixth embodiment.

Unlike the arrangement shown in FIG. 10, the arrangement shown in FIG. 23 further includes the filters 140 and 141 which are inserted after the respective amplifiers 123 and 124 so that after the outputs of the vibration detecting sensors 125 and 126 are respectively amplified by the amplifiers 123 and 124, the outputs of the amplifiers 123 and 124 are inputted to the CPU 222 via the respective filters 140 and 141. In FIG. 23, identical reference numerals are used to denote parts identical to those shown in FIG. 10, and the description thereof is omitted herein. The filters 140 and 141 are low-cut or band-pass filters for passing only a signal of predetermined frequency band. The filters 140 and 141 serve to cut the respective noise components contained in the outputs of the vibration detecting sensors 125 and 126, error signal components generated by the respective vibration detecting sensors 125 and 126 themselves, or the like. Since the frequency components of vibrations of a hand are generally distributed in a band centered at approximately 1–100 Hz, the filters 140 and 141 serve to cut signals contained in frequency bands lower or higher than the band.

As is known, it is necessary to perform an image shift for pixel shift as described previously, for example, outside the storage time of the CCD. As a result, the frequency component of a driving waveform for pixel shift becomes higher in frequency than the frequency component of a vibration of a hand.

For this reason, for example, if signals for image-shake correction and signals for pixel shift are added together in the respective adders 131 and 132 and the sum outputs of the adders 131 and 132 are filtered, it will be impossible to correctly perform an image shift for pixel shift. To solve this problem, in the tenth embodiment, the filters 140 and 141 are provided at the front stage of the adders 131 and 132.

In each of the above-described embodiments, a variable angle prism is employed as the image-shake correcting means. However, to achieve a similar effect, it is also possible to employ other optical means such as means deflecting a passing light flux by moving in a plane approximately perpendicular to an optical axis.

It is also possible to employ image-shake correcting means other than optical means, for example, image-shake correcting means for correcting an image shake by driving an image pickup element itself.

Although each of the aforesaid vibration detecting sensors is an angular-velocity sensor, such as a vibration gyro, it is also possible to employ other sensors such as a displacement sensor, an angular-displacement sensor, a velocity sensor, an acceleration sensor and an angular acceleration sensor.

Although in each of the above-described embodiments the image-shake correcting means is always driven according to both a signal for correcting an image shake and a signal for pixel shift, the image-shake correcting means may also be driven according to either one of these signals.

In each of the sixth to tenth embodiments of the present invention shown in the block diagrams of FIGS. 10, 11, 12, 19 and 23, assuming that A represents a signal for correcting an image signal; B represents a signal for pixel shift; and C represents an apex-angle detection result, control is executed so that A+B=C can be satisfied. Accordingly, since A=C−B or B=C−A is equivalent, the arrangement may be varied equivalently.

As is apparent from the above description, according to the sixth to tenth embodiments shown in FIGS. 10, 11, 12, 19 and 23, since an image-shake correcting operation and the operation of moving an image by a predetermined amount relative to a pixel pitch are performed by common actuating means, it is possible to produce a high-quality image by means of both the image-shake correcting operation and the operation of moving an image by a predetermined amount relative to a pixel pitch, without incurring an increase in the entire size of the apparatus or an increase in cost.

Since it is possible to select the function of correcting an image shake or the function of moving an image by a predetermined amount relative to a pixel pitch, it is possible to achieve, in addition to the above-described advantages, the advantage of enabling the image pickup apparatus to operate according to the intention of a user.

Also, in accordance with the present embodiments, since the operation of the light-flux deflecting means for moving an image by a predetermined amount relative to a pixel pitch is associated with the focal length of a lens, it is possible to prevent the light-flux deflecting means from inappropriately operating depending on the focal length and impairing a high-quality image.

Also, in accordance with the present embodiments, since the state of the operation of the light-flux deflecting means for moving an image by a predetermined amount relative to a pixel pitch is varied according to the focal length of the lens, it is possible to cause the light-flux deflecting means to appropriately operate at any focal length.

Also, in accordance with the present embodiments, since focal-length control is executed according to the state of the operation of the light-flux deflecting means for moving an image by a predetermined amount relative to a pixel pitch, the operation of the light-flux deflecting means is executed at an optimum focal length at which the light-flux deflecting means can suitably operate, whereby the light-flux deflecting means can always perform an optimum operation.

Also, in accordance with the present embodiments, since the amount of driving of the light-flux deflecting means for moving an image by a predetermined amount relative to a pixel pitch is made to vary according to the focal length of the lens, a high-quality image is prevented from being impaired by a variation of the focal length.

Also, in accordance with the present embodiments, since the operation of the light-flux deflecting means to move an image by a predetermined amount relative to a pixel pitch is restricted according to the focal length of the lens, it is possible to prevent the light-flux deflecting means from inappropriately operating at a focal length which is not suited to the operation of the light-flux deflecting means.

Also, in accordance with the present embodiments, since the number of driving steps in which the driving means stepwise drives the light-flux deflecting means to move an image by a predetermined amount relative to a pixel pitch is made to vary according to the focal length of the lens, a high-quality image can be achieved even by using the driving means for performing stepwise driving.

Also, in accordance with the present embodiments, in a system in which the light-flux deflecting means is driven by the driving means for performing stepwise driving, the focal length of the lens is determined according to whether the light-flux deflecting means is to be operated. Accordingly, the light-flux deflecting means can always operate at a focal length which is suited to the stepwise driving of the light-flux deflecting means, so that a high-quality image can be retained.

Also, in accordance with the present embodiments, since the operation of moving an image by a predetermined amount relative to a pixel pitch is performed outside an image storage time, it is possible to prevent such operation from adversely affecting an image storage process.

Incidentally, the major elements used in each of the sixth to tenth embodiments correspond to elements of the present invention in the following manner. The variable angle prism 114 corresponds to the actuating means and the light-flux deflecting means of the present invention. The CPU 111 (222), the waveform oscillators 129 and 130, the adders 131 and 132, and the voltage determining circuits 121 and 122 correspond to the control means of the present invention. The switch part contained in each of the adders corresponds to the selecting means of the present invention. The zoom encoder 133 and the operation of controlling the outputs of the waveform oscillators 129 and 130 according to the output of the zoom encoder 133 correspond to relating means, operating-state varying means and amount-of-driving means. The stepping motors 138, 144 and 145 correspond to the driving means for stepwise driving the light-flux deflecting means. Step S304 of the operation of the CPU 222 corresponds to number-of-driving-steps varying means of the present invention. The operation of limiting the range of settable focal lengths corresponds to the relating means and focal-length controlling means of the present invention. The operation of automatically turning off a pixel shifting function corresponds to restricting means of the present invention. The CCD 101 corresponds to the storage means of the present invention. The on/off switch 134 and the control circuit 135 correspond to operating-time controlling means.

What is claimed is:

1. An image pickup apparatus comprising:
   (A) image pickup means for photoelectrically converting an optical image formed on an image pickup plane via an image pickup optical system and outputting a picked-up image signal;
   (B) A variable optical system, arranged in said image pickup optical system, for shifting the optical image on the image pickup plane of said image pickup means by deflecting an optical axis of said image pickup optical system;
   (C) control means for controlling said variable optical system and said image pickup means to pickup a predetermined field of view larger than the image pickup plane of said image pickup means by causing said variable optical system to shift to a plurality of shifting position and to deflect the optical axis corresponding to the shifting positions and causing said image pickup means to pickup a plurality of optical images at the plurality of shifting positions, respectively;

(D) A/D converting means for converting picked-up image signals outputted from said image pickup means into digital image signals;

(E) memory means for storing the digital image signals outputted from said A/D converting means; and (F) signal processing means for combining the digital image signals corresponding to the plurality of the optical images stored in said memory means and produced an image signal corresponding to said predetermined field of view.

2. An image pickup apparatus according to claim 1, wherein said variable optical system varies an apex angle of said image pickup optical system.

3. An image pickup apparatus according to claim 2, wherein said variable optical system is a variable angle prism.

4. An image pickup apparatus according to claim 1, further comprising control means for causing said variable optical system to vibrate periodically and causing said image pickup means to pickup images relative to two different positions, as well as causing said memory means to store the images relative to the two different positions.

5. An image pickup apparatus according to claim 4, wherein said control means causes said variable optical system to vibrate periodically within limits of a distance between pixels of said image pickup means and makes it possible to pick up an image indicative of information present between the pixels of said image pickup means.

6. An image pickup apparatus according to claim 5, wherein said control means causes said image pickup means to alternately pick up an image relative to a position occupied by the pixels of said image pickup means and an image relative to a position occupied by areas between the pixels, which images are obtained by causing said variable optical system to vibrate periodically within the limits of the distance between the pixels of said image pickup means, stores the images in said memory means and combines the images to make it possible to pick up an image using pixels the number of which substantially exceeds a total number of pixels of said image pickup means.

7. An image pickup apparatus according to claim 4, wherein said control means causes said variable optical system to vibrate with an amplitude of not less than an entire length of one picture of said image pickup means and makes it possible to pick up an image for a plurality of pictures continuously obtainable in a direction of movement of said variable optical system.

8. An image pickup apparatus according to claim 7, wherein said control means causes said variable optical system to move by a distance equivalent to a total length of the plurality of pictures of said image pickup means, causes said image pickup means to pick up images for the plurality of pictures continuously obtainable in the direction of movement of said variable optical system, stores the images in said memory means and combines the images to make it possible to pick up a wide image which is long in the direction of movement.

9. An image pickup apparatus comprising:

(A) image pickup means for photoelectrically converting an optical image formed on an image pickup plane via an image pickup optical system and outputting a picked-up image signal;

(B) a variable optical system, arranged in said image pickup optical system, for varying an image forming position in the image pickup plane of the optical image made incident on said image pickup means by deflecting an optical axis of said image pickup optical system;

(C) A/D converting means for converting the picked-up image signal outputted from said image pickup means into a digital picked-up image signal;

(D) memory means for storing the digital picked-up image signal outputted from said A/D converting means;

(E) control means for causing said variable optical system to deflect the optical axis in a predetermined direction to pickup a predetermined field of view larger than the size of the image pickup plane and causing said image pickup means to pickup images corresponding to a plurality of different positions of said variable optical system, as well as causing said memory means to store the images corresponding to the plurality of different positions; and (F) signal processing means for combining picked-up image signals corresponding to a plurality of optical images stored in said memory means to produce an image signal corresponding to said predetermined field of view.

10. An image pickup apparatus according to claim 9, wherein said variable optical system is a variable angle prism for varying an apex angle of said image pickup optical system.

11. An image pickup apparatus according to claim 9, wherein said control means causes said variable optical system to vibrate periodically and causes said image pickup means to pickup images relative to two different positions, as well as causes said memory means to store the images relative to the two different positions.

12. An image pickup apparatus according to claim 11, wherein said control means causes said variable optical system to vibrate periodically within limits of a distance between pixels of said image pickup means and makes it possible to pick up an image indicative of information present between the pixels of said image pickup means.

13. An image pickup apparatus according to claim 12, wherein said control means causes said image pickup means to alternately pick up an image relative to a position occupied by the pixels of said image pickup means and an image relative to a position occupied by areas between the pixels, which images are obtained by causing said variable optical system to vibrate periodically within the limits of the distance between the pixels of said image pickup means, stores the images in said memory means and combines the images to make it possible to pick up an image using pixels the number of which substantially exceeds a total number of pixels of said image pickup means.

14. An image pickup apparatus according to claim 11, wherein said control means causes said variable optical system to vibrate with an amplitude of not less than an entire length of one picture of said image pickup means and makes it possible to pick up an image for a plurality of pictures continuously obtainable in a direction of movement of said variable optical system.

15. An image pickup apparatus according to claim 14, wherein said control means causes said variable optical system to move by a distance equivalent to a total length of the plurality of pictures of said image pickup means, causes said image pickup means to pick up images for the plurality of pictures continuously obtainable in the direction of movement of said variable optical system, stores the images in said memory means and combines the images to make it possible to pick up a wide image which is long in the direction of movement.

16. An image pickup apparatus comprising:

(A) image pickup means for photoelectrically converting an optical image formed in an image pickup plane via an image pickup optical system and outputting a picked-up image signal;

(B) a shake correcting optical system for correcting a shake of an image by varying an image forming position in the image pickup plane of the optical image made incident on said image pickup means by deflecting a direction of an optical axis of said image pickup optical system;

(C) A/D converting means for converting the picked-up image signal outputted from said image pickup means into a digital picked-up image signal;

(D) memory means for storing the digital picked-up image signal outputted from said A/D converting means;

(E) control means for causing said shake correcting optical system to deflect the optical axis in a predetermined direction to pickup a predetermined field of view larger than the size of the image pickup plane and causing said image pickup means to pickup images relative to a plurality of different positions, as well as causing said memory means to store the images relative to the plurality of different positions; and (F) signal processing means for combining picked-up image signals corresponding to a plurality of optical images stored in said memory means to produce an image signal corresponding to said predetermined field of view.

17. An image pickup apparatus according to claim 16, wherein said shake correcting optical system is a variable angle prism for varying an apex angle of said image pickup optical system.

18. An image pickup apparatus according to claim 16, wherein said control means causes said shake correcting optical system to vibrate periodically within limits of a distance between pixels of said image pickup means and makes it possible to pick up an image indicative of information present between the pixels of said image pickup means.

19. An image pickup apparatus according to claim 18, wherein said control means causes said image pickup means to alternately pick up an image relative to a position occupied by the pixels of said image pickup means and an image relative to a position occupied by areas between the pixels, which images are obtained by causing said shake correcting optical system to vibrate periodically within the limits of the distance between the pixels of said image pickup means, stores the images in said memory means and combines the images to make it possible to pick up an image using pixels the number of which substantially exceeds a total number of pixels of said image pickup means.

20. An image pickup apparatus according to claim 16, wherein said control means causes said shake correcting optical system to vibrate with an amplitude of not less than an entire length of one picture of said image pickup means and makes it possible to pick up an image for a plurality of pictures continuously obtainable in a direction of movement of said shake correcting optical system.

21. An image pickup apparatus according to claim 20, wherein said control means causes said shake correcting optical system to move by a distance equivalent to a total length of the plurality of pictures of said image pickup means, causes said image pickup means to pick up images for the plurality of pictures continuously obtainable in the direction of movement of said shake correcting optical system, stores the images in said memory means and combines the images to make it possible to pick up a wide image which is long in the direction of movement.

* * * * *

UNITED STATES PATENT AND TRADEMARK OFFICE
CERTIFICATE OF CORRECTION

PATENT NO. : 5,889,553
DATED : March 30, 1999
INVENTOR(S) : Yoshiki Kino, et al.

It is certified that error appears in the above-identified patent and that said Letters Patent is hereby corrected as shown below:

Col. 15, line 38, after Sho delete "6-1191166" and insert --61-191166--.

Signed and Sealed this

Twenty-eighth Day of December, 1999

Attest:

Q. TODD DICKINSON

*Attesting Officer*   Acting Commissioner of Patents and Trademarks